(12) United States Patent
Tsuboi et al.

(10) Patent No.: US 6,761,037 B2
(45) Date of Patent: Jul. 13, 2004

(54) VEHICLE AIR CONDITIONER USING A HYBRID COMPRESSOR

(75) Inventors: Masato Tsuboi, Isesaki (JP); Atsuo Inoue, Isesaki (JP); Kenichi Suzuki, Isesaki (JP); Tomonori Imai, Isesaki (JP)

(73) Assignee: Sanden Corporation, Gunma (JP)

( * ) Notice: Subject to any disclaimer, the term of this patent is extended or adjusted under 35 U.S.C. 154(b) by 0 days.

(21) Appl. No.: 10/347,630

(22) Filed: Jan. 22, 2003

(65) Prior Publication Data

US 2003/0136138 A1 Jul. 24, 2003

(30) Foreign Application Priority Data

Jan. 23, 2002 (JP) ........................................ 2002/014032
Jan. 24, 2002 (JP) ........................................ 2002/015391
Jan. 24, 2002 (JP) ........................................ 2002/015393

(51) Int. Cl.$^7$ ................................................ B60H 1/32
(52) U.S. Cl. ............................ 62/244; 417/374; 62/236; 165/42; 165/43
(58) Field of Search ................................ 62/244, 196.2, 62/228.5, 133, 236; 417/62, 374, 426; 165/42, 43

(56) References Cited

U.S. PATENT DOCUMENTS

| | | | |
|---|---|---|---|
| 4,591,318 A | | 5/1986 | Elson |
| 4,990,071 A | | 2/1991 | Sugimoto |
| 5,385,453 A | | 1/1995 | Fogt et al. |
| 5,435,144 A | | 7/1995 | Kalmbach |
| 5,755,564 A | | 5/1998 | Machida et al. |
| 5,867,996 A | * | 2/1999 | Takano et al. ............... 62/175 |
| 5,983,656 A | | 11/1999 | Tokumasu |
| 6,109,045 A | | 8/2000 | Takenaka |
| 6,192,155 B1 | | 2/2001 | Fan |
| 6,217,297 B1 | | 4/2001 | Tsumagari et al. |
| 6,230,507 B1 | * | 5/2001 | Ban et al. ............... 62/228.4 |
| 6,234,769 B1 | * | 5/2001 | Sakai et al. ............... 417/374 |
| 6,247,899 B1 | * | 6/2001 | Ban et al. ............... 417/16 |
| 6,287,081 B1 | * | 9/2001 | Tamegai et al. ............... 417/15 |
| 6,334,755 B1 | | 1/2002 | Coudray et al. |
| 6,375,436 B1 | * | 4/2002 | Irie et al. ............... 417/223 |
| 6,443,712 B2 | * | 9/2002 | Sakai et al. ............... 417/374 |
| 6,543,243 B2 | * | 4/2003 | Mohrmann et al. ............... 62/230 |
| 2001/0047659 A1 | | 12/2001 | Nakamura et al. |
| 2001/0049943 A1 | | 12/2001 | Nakamura et al. |
| 2003/0053916 A1 | | 3/2003 | Terauchi |
| 2004/0020229 A1 | | 5/2003 | Adachi et al. |
| 2003/0152467 A1 | | 8/2003 | Higashiyama et al. |
| 2004/0000156 A1 | | 1/2004 | Inoue et al. |
| 2004/0001760 A1 | | 1/2004 | Yoshii et al. |

FOREIGN PATENT DOCUMENTS

| | | |
|---|---|---|
| DE | 19513710 | 10/1995 |
| EP | 1213166 | 6/2002 |
| JP | 60-153885 | 10/1985 |
| JP | 687678 | 12/1994 |
| JP | 02001310624 A | * 11/2001 |

* cited by examiner

Primary Examiner—William E. Topolcai
Assistant Examiner—Mohammad M. Ali
(74) Attorney, Agent, or Firm—Baker Botts L.L.P.

(57) ABSTRACT

An air conditioner for a vehicle uses a hybrid compressor (4) including a first compression mechanism driven by a first drive source (2) and a second compression mechanism driven by a second drive source (5), and a single discharge port connected to the first and the second compression mechanisms. The operation of the hybrid compressor is controlled by a controller (15) in accordance with a control mode. The controller has a first operation mode in which the first compression mechanism alone is driven, a second operation mode in which the second compression mechanism alone is driven, a third operation mode in which the first and the second compression mechanisms are simultaneously driven, and a fourth operation mode in which the first and the second compression mechanisms are simultaneously stopped. Depending upon various conditions, the controller selects, as the control mode, one of the first, the second, the third, and the fourth operation modes.

27 Claims, 17 Drawing Sheets

VEHICLE AIR CONDITIONER USING A HYBRID COMPRESSOR

BACKGROUND OF THE INVENTION

This application claims priority to prior applications JP 2002-014032, JP 2002-015391, and JP 2002-015393, the disclosures of which are incorporated herein by reference.

This invention relates to an air conditioner for a vehicle and particular to an air conditioner comprising a hybrid compressor which is adapted to obtain drive force from a prime mover, i.e., an engine mounted on the vehicle and from an electric motor different from the prime mover.

There is known an air conditioner mounted on a vehicle, i.e., an automobile. Such an automobile air conditioner includes a refrigerating or refrigerant cycle. The refrigerating cycle comprises a compressor connected as one of components thereof. The compressor may be of a type driven by an automobile engine or a type driven by a special electric motor mounted on an automobile.

Japanese Unexamined Utility Model Publication No. H6-87678 (JP 6-87678 U) discloses an automotive air conditioner using a compressor which can be driven by one of an automobile engine and an electric motor, i.e., a hybrid compressor. In the automotive air conditioner, the compressor is driven by the automobile engine when the automobile engine is operated. When the automobile engine is stopped, the compressor is driven by the electric motor.

However, in case where the compressor is driven by the automobile engine, a driving speed of the compressor depends upon the rotation speed of the engine. If an air-conditioning load is great, an air-conditioning ability may sometimes be insufficient. On the other hand, if the compressor is driven by the electric motor, the rotation speed of the compressor is restricted if the capacity of an electric power source of the automobile is insufficient. In this case also, if the air-conditioning load is great, the air-conditioning ability may sometimes be insufficient. The above-mentioned disadvantages result from the fact that the compressor is driven only by a selected one of the automobile engine and the electric motor.

SUMMARY OF THE INVENTION

It is therefore an object of the present invention to provide an air conditioner for a vehicle, using a hybrid compressor and capable of achieving an excellent air-conditioning ability.

It is another object of the present invention to provide an air conditioner of the type described, which is improved in performance by appropriately controlling operation of a hybrid compressor.

It is still another object of the present invention to provide an air conditioner of the type described, which allows reduction in power consumption of a hybrid compressor during high-speed rotation of a prime mover as well as decrease in torque shock known in the art.

It is yet another object of the present invention to provide an air conditioner of the type described, which is capable of minimizing variation in air-conditioning ability even if the rotation speed of a prime mover for driving a hybrid compressor is varied.

It is a further object of the present invention to provide an air conditioner of the type described, in which an electric motor for driving a hybrid compressor can be optimally controlled even if an electric power is restricted.

It is a still further object of the present invention to provide an air conditioner of the type described, which is capable of minimizing variation in air-conditioning ability when a hybrid compressor is driven simultaneously by both of a prime mover and an electric motor.

Other objects of the present invention will be clear as the description proceeds.

According to an aspect of the present invention, there is provided an air conditioner for a vehicle, comprising a hybrid compressor which includes a first compression mechanism driven by a first drive source, a second compression mechanism driven by a second drive source, and a single discharge port connected to the first and the second compression mechanisms, a refrigerating cycle connected to the hybrid compressor, and a controller connected to the hybrid compressor for controlling an operation of the hybrid compressor in accordance with a control mode, the controller includes an operation mode setting portion for setting a first operation mode in which the first compression mechanism alone is driven, a second operation mode in which the second compression mechanism alone is driven, a third operation mode in which the first and the second compression mechanisms are simultaneously driven, and a fourth operation mode in which the first and the second compression mechanisms are simultaneously stopped, and a mode selecting portion connected to the operation mode setting portion for selecting, as the control mode, one of the first, the second, the third, and the fourth operation modes.

DESCRIPTION OF THE PREFERRED EMBODIMENTS

Although description will be made as regards an air conditioner which is mounted on an automobile and therefore may be called hereinunder an automobile air conditioner, the present invention is broadly applicable to various air conditioners for a vehicle without being limited only to the automobile air conditioner.

Figure 1:
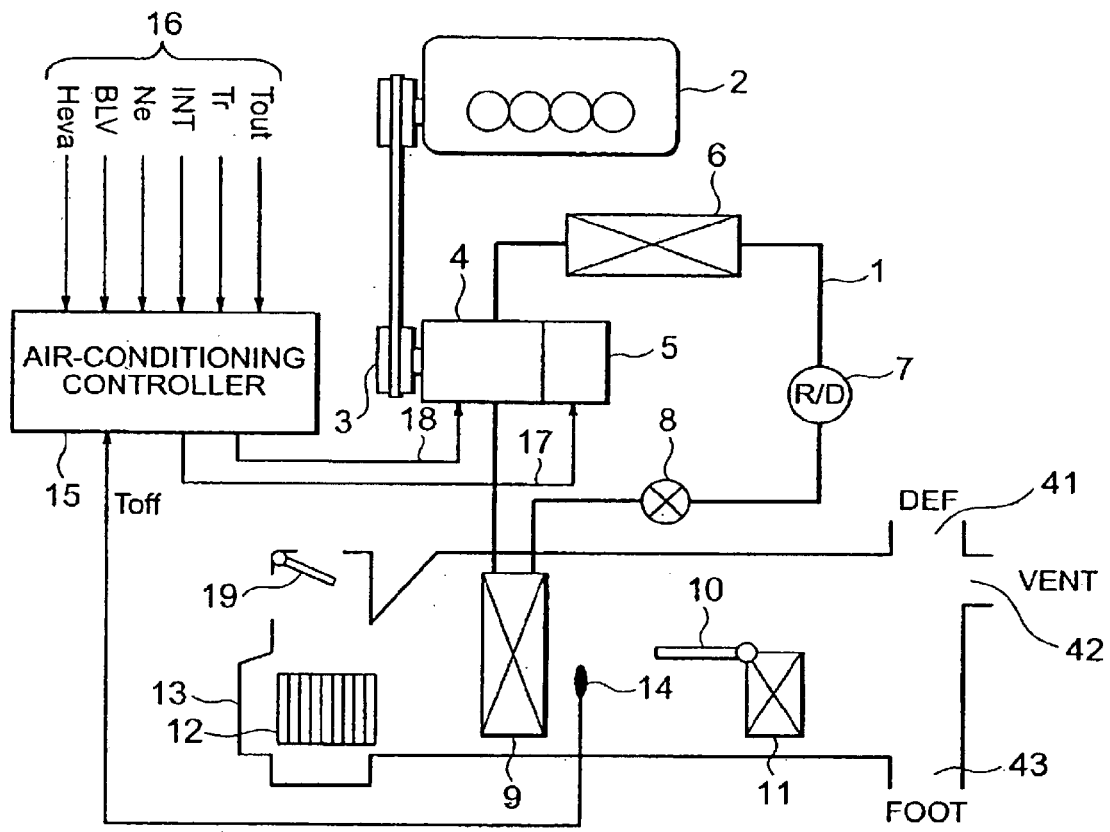
FIG. 1 is a system diagram of an air conditioner according to a first embodiment of the present invention.

Referring to FIG. 1, description will be made about an air conditioner according to a first embodiment of the present invention.

To a refrigerating cycle 1, a hybrid compressor 4 is connected as one of components thereof. The hybrid compressor 4 comprises a first compression mechanism driven by an automobile prime mover alone and a second compression mechanism driven by an electric motor alone and integrally coupled to the first compression mechanism. The automobile prime mover, i.e., an engine 2 generates drive force which can be transmitted through a belt and an electromagnetic clutch 3 to the first compression mechanism of the hybrid compressor 4. The electric motor 5 generates drive force which can be transmitted directly to the second compression mechanism of the hybrid compressor 4. A specific example of the hybrid compressor 4 will later be described in detail.

In the refrigerating cycle 1, a high-temperature high-pressure refrigerant compressed by the hybrid compressor 4 is supplied to a condenser 6 as an external heat exchanger and cooled by heat exchange with outside air to be condensed and put into a liquid phase. The refrigerant is separated by a liquid receiver 7 into a gaseous-phase refrigerant and a liquid-phase refrigerant. The liquid-phase refrigerant is reduced in pressure by an expansion valve 8 into a low-pressure liquid-phase refrigerant. The low-pressure refrigerant flows into an evaporator 9 as an internal heat exchanger and is subjected to heat exchange with air blown by a fan or a blower 12 to be evaporated into a gaseous-phase refrigerant. The gaseous-phase refrigerant is sucked again into the hybrid compressor 4 to be compressed.

An air duct 13 for passage of air for room air-conditioning is provided with the blower 12, the evaporator 9, an air-mix damper 10, and a heater core 11. After passing through the evaporator 9, the air passes through the heater core 11 at a ratio determined by an aperture of the air-mix damper 10 to be heated. On a downstream end of the air duct 13, discharge ports 41, 42, and 43 such as DEF, VENT, and FOOT are formed. By dampers (not shown) corresponding to the respective discharge ports, a predetermined one or ones of the discharge ports are selected to deliver conditioned air into a room.

The automotive air conditioner illustrated in FIG. 1 has an evaporator outlet air temperature sensor 14 for detecting an evaporator outlet air temperature Toff, i.e., an air temperature after the air passes through the evaporator 9. The evaporator outlet air temperature sensor 14 produces a signal representative of the evaporator outlet air temperature Toff thus detected and supplies the signal to an air-conditioning controller 15. Furthermore, the air-conditioning controller 15 is supplied with a signal group 16 representative of an outside air temperature Tout, a room air temperature Tr, a switching damper position INT of an inside/outside air switching damper 19, an engine rotation speed Ne, a blower voltage BLV, and an evaporator inlet air temperature Teva. As output signals, an electric motor rotation speed control signal 17 and a clutch control signal 18 are produced.

When the second compression mechanism of the hybrid compressor 4 is driven by the electric motor 5, the clutch 3 is turned off by the clutch control signal 18. Then, the electric motor rotation speed control signal 17 as a duty signal is supplied to the electric motor 5 to control the rotation speed of the electric motor 5. On the other hand, in case where the first compression mechanism of the compressor 4 is driven by the engine 2, output of the electric motor rotation speed control signal 17 is stopped and the clutch 3 is turned on.

In case where the hybrid compressor 4 is driven simultaneously by the engine 2 and the electric motor 5, the clutch 3 is turned on by the clutch control signal 18 and the electric motor rotation speed control signal 17 as a duty signal is supplied to the electric motor 5 to control the rotation speed of the electric motor 5.

The air temperature after the air passes through the evaporator 9 is controlled by controlling the motor rotation speed and by controlling one/off of the clutch when the compressor is driven by the electric motor 5 and when the compressor is driven by the engine 2, respectively.

Figure 2:
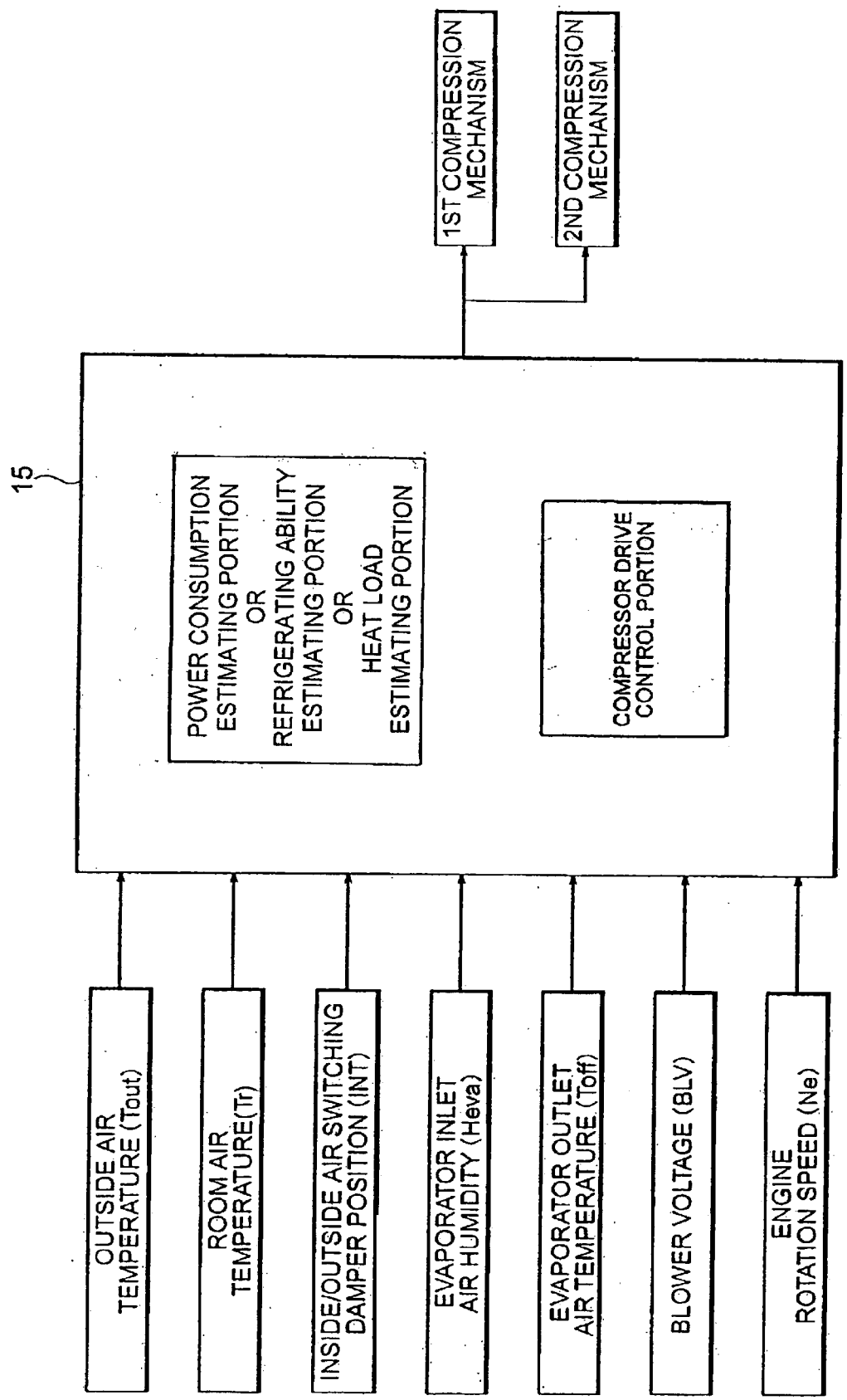
FIG. 2 is a block diagram of a controller in the air conditioner illustrated in FIG. 1.

Referring to FIG. 2 in addition, an operation of the air-conditioning controller 15 will be described.

With reference to the evaporator outlet air temperature Toff, the outside air temperature Tout, the room air temperature Tr, the switching damper position INT of the inside/outside air switching damper 19, the engine rotation speed Ne, the blower voltage BLV, and the evaporator inlet air temperature Teva, the air-conditioning controller 15 estimates and calculates power consumption or refrigerating ability LB which is given by:

LB=f(INT, Tout, Ne, Tr, BLV, Teva, Toff).

Herein, the air-conditioning controller 15 serves as a power estimating portion or an ability estimating portion.

With reference to the power consumption or the refrigerating ability LB, the air-conditioning controller 15 serves as a compressor drive control portion and controls driving of the hybrid compressor 4 in accordance with a control mode which will presently be described.

In the air-conditioning controller 15, selection is made of a first operation mode in which the first compression mechanism alone is driven, a second operation mode in which the second compression mechanism alone is driven, and a third operation mode in which the first and the second compression mechanisms are simultaneously driven, and a fourth operation mode in which the first and the second compression mechanisms are simultaneously stopped. In this case, the air-conditioning controller 15 serves as an operation mode setting portion.

Furthermore, the air-conditioning controller 15 selects, as the control mode, one of the first, the second, the third, and the fourth operation modes with reference to the power consumption or the refrigerating ability LB. In this case, the air-conditioning controller 15 serves as a mode selecting portion.

Figure 3:
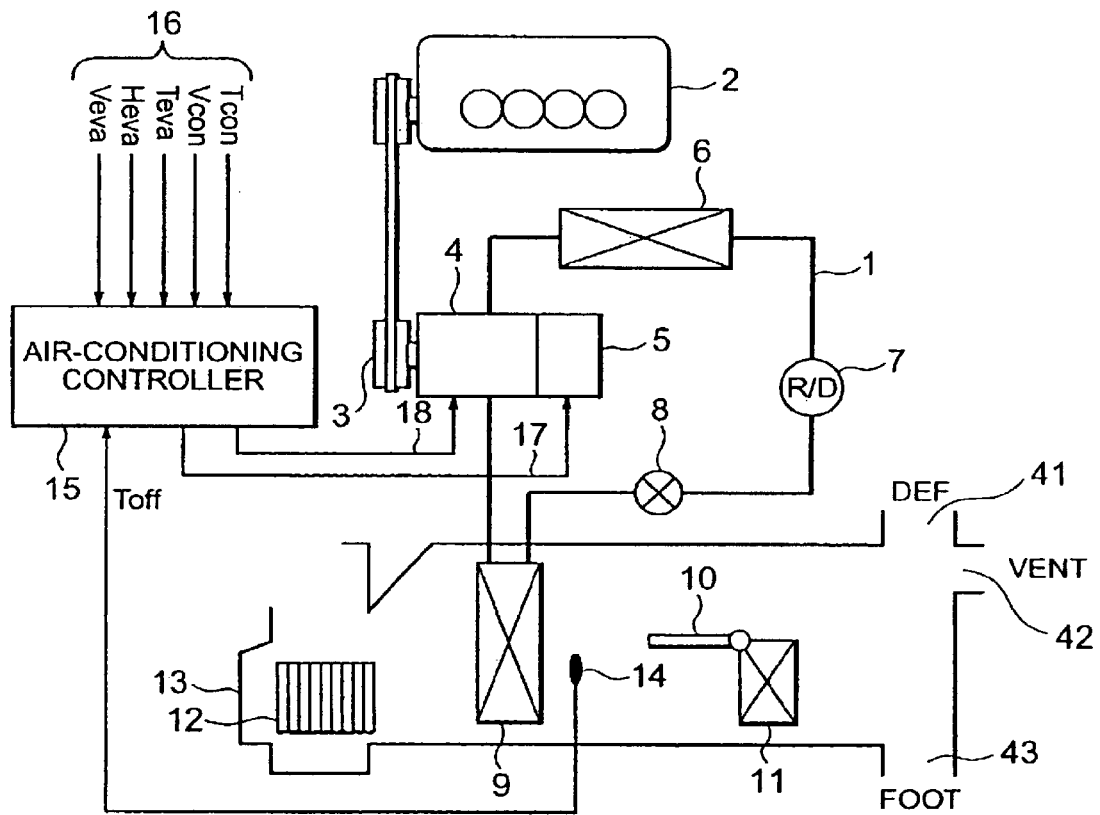
FIG. 3 is a system diagram of an air conditioner according to a second embodiment of the present invention.

Referring to FIG. 3, description will be made of an automotive air conditioner according to a second embodiment of the present invention. Similar parts are designated by like reference numerals and description thereof will be omitted. In this automotive air conditioner also, the air-conditioning controller 15 selects, as the control mode, one of the first, the second, the third, and the fourth operation modes.

In the automotive air conditioner illustrated in FIG. 3, the signal representative of the air temperature detected by the evaporator outlet air temperature sensor 14 is supplied to the air-conditioning controller 15. Furthermore, the air-conditioning controller 15 is supplied with the signal group 16 representative of a condenser inlet air temperature Tcon, a condenser inlet air speed Vcon, the evaporator inlet air temperature Teva, an evaporator inlet air humidity Heva, an evaporator inlet air speed Veva, and the like. The electric motor rotation speed control signal 17 and the clutch control signal 18 are supplied from the air-conditioning controller 15 to the hybrid compressor 4.

Figure 4:
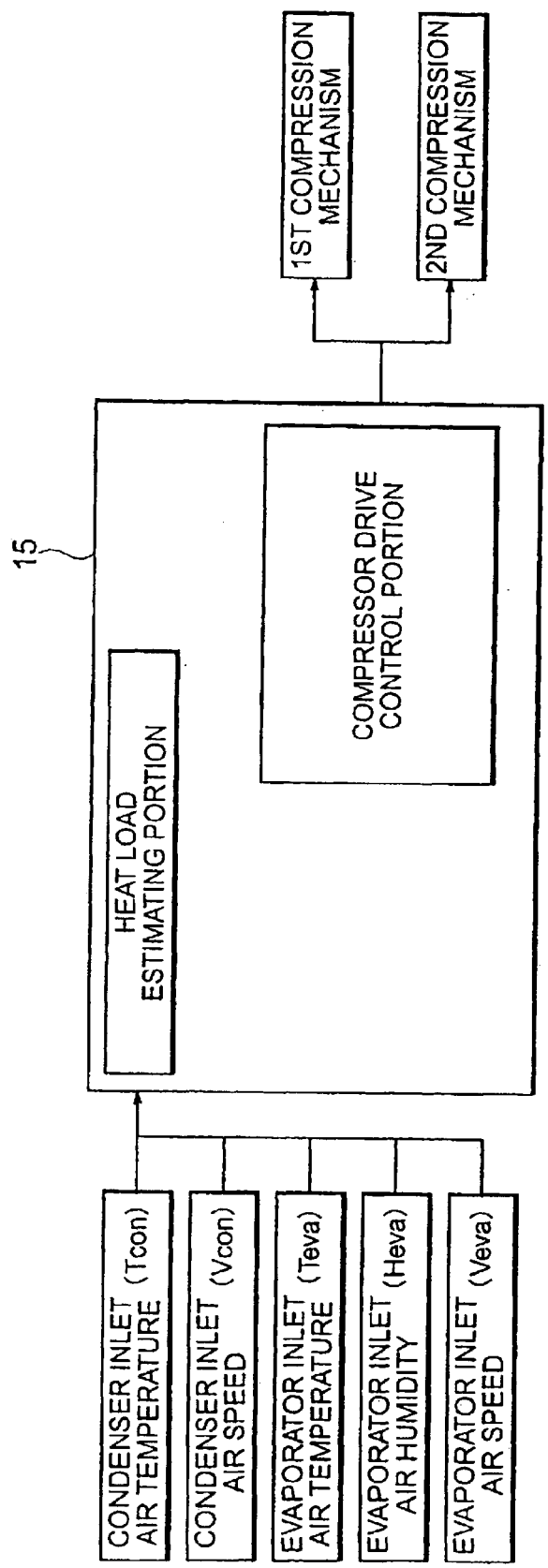
FIG. 4 is a block diagram of a controller in the air conditioner illustrated in FIG. 3.

Referring to FIG. 4 in addition, an operation of the air-conditioning controller 15 will be described.

With reference to the signal group 16 representative of the condenser inlet air temperature Tcon, the condenser inlet air speed Vcon, the evaporator inlet air temperature Teva, the evaporator inlet air humidity Heva, the evaporator inlet air speed Veva, and the like, the air-conditioning controller 15 estimates and calculates a heat load in an automobile, i.e., an air-conditioning load LA given by:

$$LA = f(Tcon, Vcon, Teva, Heva, Veva).$$

Herein, the air-conditioning controller 15 serves as a heat load estimating portion.

With reference to the relationship between the air-conditioning load LA and a predetermined value d, the air-conditioning controller 15 serves as a compressor drive control portion and controls driving of the hybrid compressor 4 in accordance with the control mode to select simultaneous operation of the first and the second compression mechanisms or operation of the first or the second compression mechanism. Specifically, if $LA \geq d$, the simultaneous operation is selected. On the other hand, if $LA < d$, the operation of the first or the second compression mechanism is selected. Thus, when the load is great, the simultaneous operation is selected so as to avoid insufficiency in air-conditioning ability. When the load is small, the operation of the first or the second compression mechanism is selected so as to produce desired air-conditioning ability with small power consumption without affecting other apparatuses and other operating conditions.

Figure 5:
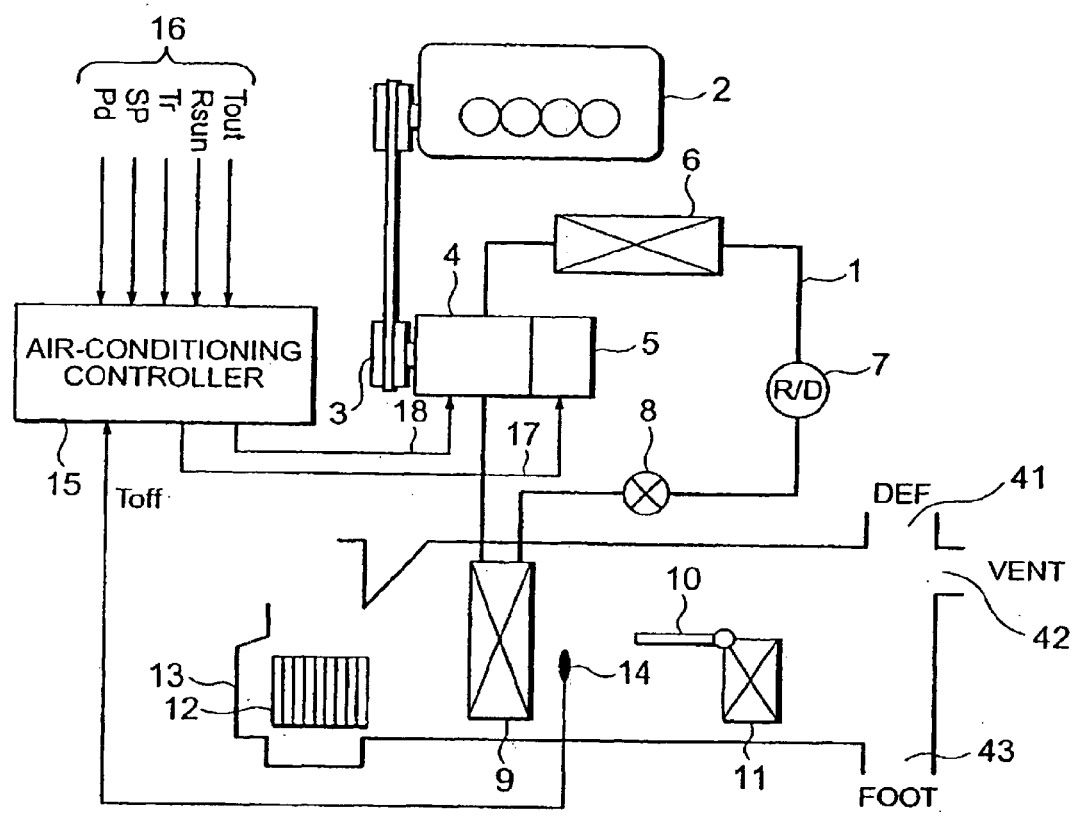
FIG. 5 is a system diagram of an air conditioner according to a third embodiment of the present invention.

Referring to FIG. 5, description will be made of an automotive air conditioner according to a third embodiment of the present invention. Similar parts are designated by like reference numerals and description thereof will be omitted. In this automotive air conditioner also, the air-conditioning controller 15 selects, as the control mode, one of the first, the second, the third, and the fourth operation modes.

In the automotive air conditioner illustrated in FIG. 5, the signal representative of the evaporator outlet air temperature Toff detected by the evaporator outlet air temperature sensor 14 is supplied to the air-conditioning controller 15. Furthermore, the air-conditioning controller 15 is supplied with the signal group 16 representative of the outside air temperature Tout, solar irradiation Rsun, the room air temperature Tr, an automobile speed SP, a refrigerant pressure Pd in a high pressure part, and the like. The electric motor rotation speed control signal 17 and the clutch control signal 18 are supplied from the air-conditioning controller 15 to the hybrid compressor 4.

Figure 6:
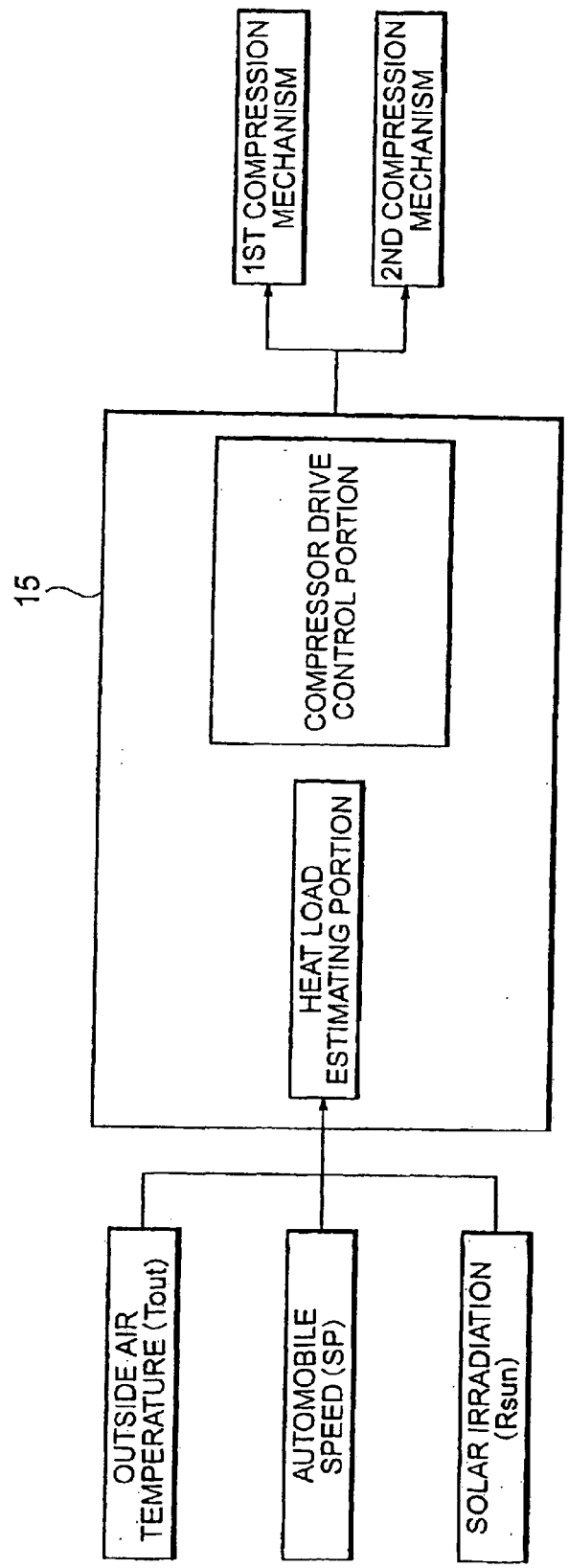
FIG. 6 is a block diagram of a controller in the air conditioner illustrated in FIG. 5.

Referring to FIG. 6 in addition, an operation of the air-conditioning controller 15 will be described.

With reference to the signals representative of, for example, the outside air temperature Tout, the automobile speed SP, and the solar irradiation Rsun, the air-conditioning controller 15 estimates and calculates the air-conditioning load LA given by:

$$LA = f(Tout, SP, Rsun).$$

Herein, the air-conditioning controller 15 serves as a heat load estimating portion.

With reference to the relationship between the air-conditioning load LA and the predetermined value d, the air-conditioning controller 15 serves as a compressor drive control portion and controls driving of the hybrid compressor 4 in accordance with the control mode to select simultaneous operation of the first and the second compression mechanisms or operation of the first or the second compression mechanism. Specifically, if $LA \geq d$, the simultaneous operation is selected. On the other hand, if $LA < d$, the operation of the first or the second compression mechanism is selected. Thus, when the load is great, the simultaneous operation is selected so as to avoid insufficiency in air-conditioning ability. When the load is small, the operation of the first or the second compression mechanism is selected so as to produce desired air-conditioning ability with small power consumption without affecting other apparatuses or other operating conditions.

Figure 7:
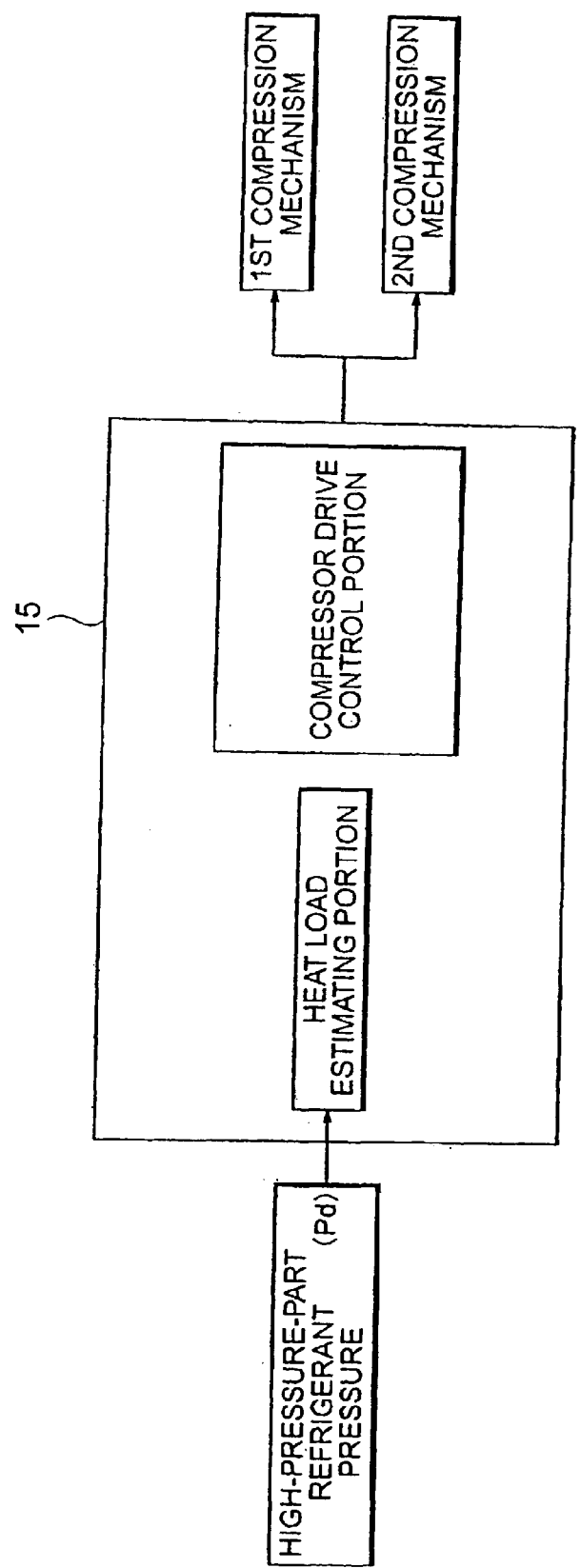
FIG. 7 is a block diagram of another controller which can be used in the air conditioner illustrated in FIG. 5.

Referring to FIG. 7 in addition to FIG. 5, description will be made of another example of the air-conditioning controller 15. This air-conditioning controller 15 also selects, as the control mode, one of the first, the second, the third, and the fourth operation modes.

In this example, with reference to the signal representative of the high-pressure-part refrigerant pressure Pd, the air-conditioning load LA in the automobile is estimated and calculated by:

$$LA = f(Pd).$$

Herein, the air-conditioning controller 15 serves as a heat load estimating portion.

With reference to the relationship between the air-conditioning load LA and the predetermined value d, the air-conditioning controller 15 serves as a compressor drive control portion and controls driving of the hybrid compressor 4 in accordance with the control mode to select simultaneous operation of the first and the second compression mechanisms or operation of the first or the second compression mechanism. Specifically, if $LA \geq d$, the simultaneous operation is selected. On the other hand, if $LA < d$, the operation of the first or the second compression mechanism is selected. Thus, when the load is great, the simultaneous operation is selected so as to avoid insufficiency in air-conditioning ability. When the load is small, the operation of the first or the second compression mechanism is selected so as to produce a desired air-conditioning ability with small power consumption without affecting other apparatuses or other operating conditions.

Figure 8:
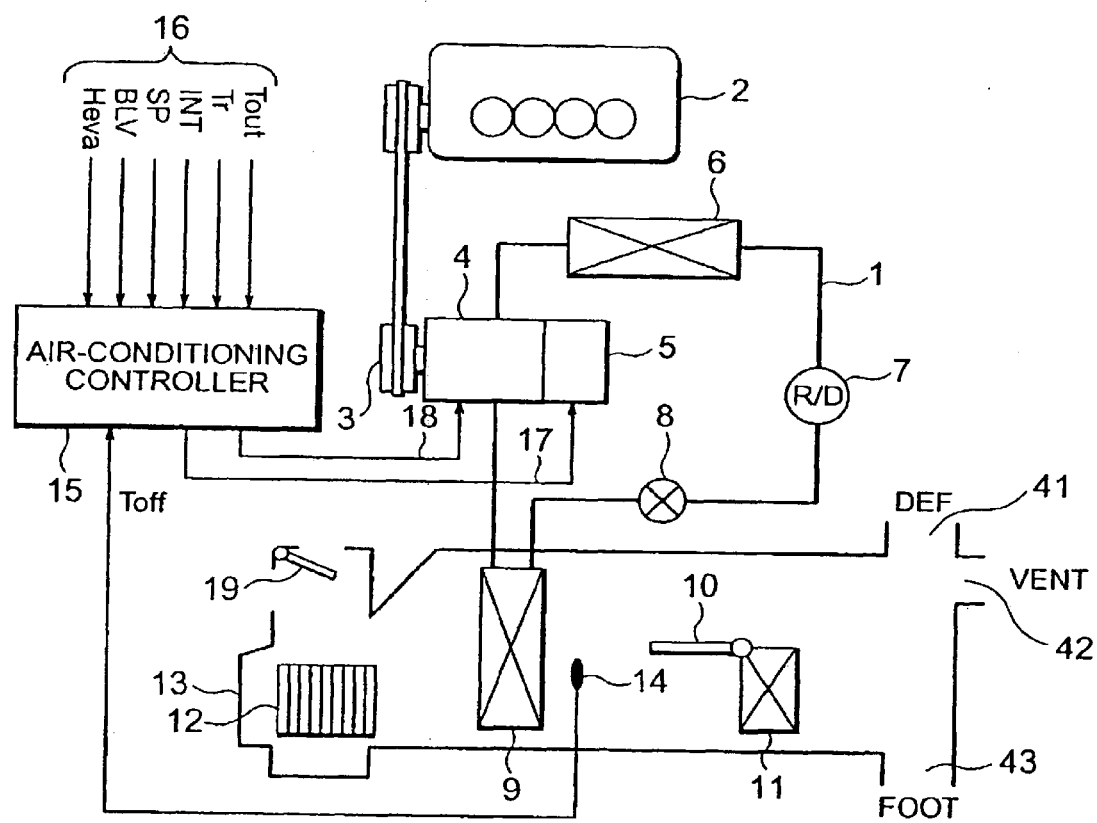
FIG. 8 is a system diagram of an air conditioner according to a fourth embodiment of the present invention.

Referring to FIG. 8, description will be made of an automotive air conditioner according to a fourth embodiment of the present invention. Similar parts are designated by like reference numerals and description thereof will be omitted. In this automotive air conditioner also, the air-conditioning controller 15 selects, as a control mode, one of the first, the second, the third, and the fourth operation modes.

In the automotive air conditioner illustrated in FIG. 8, the signal representative of the air temperature detected by the evaporator outlet air temperature sensor 14 is supplied to the air-conditioning controller 15. Furthermore, the air-conditioning controller 15 is supplied with the signal group 16 representative of the outside air temperature Tout, the room air temperature Tr, the inside/outside air switching damper position INT, the automobile speed SP, the blower voltage BLV, and the evaporator inlet air humidity Heva, and the like. The electric motor rotation speed control signal 17 and the clutch control signal 18 are supplied from the air-conditioning controller 15 to the hybrid compressor 4.

Figure 9:
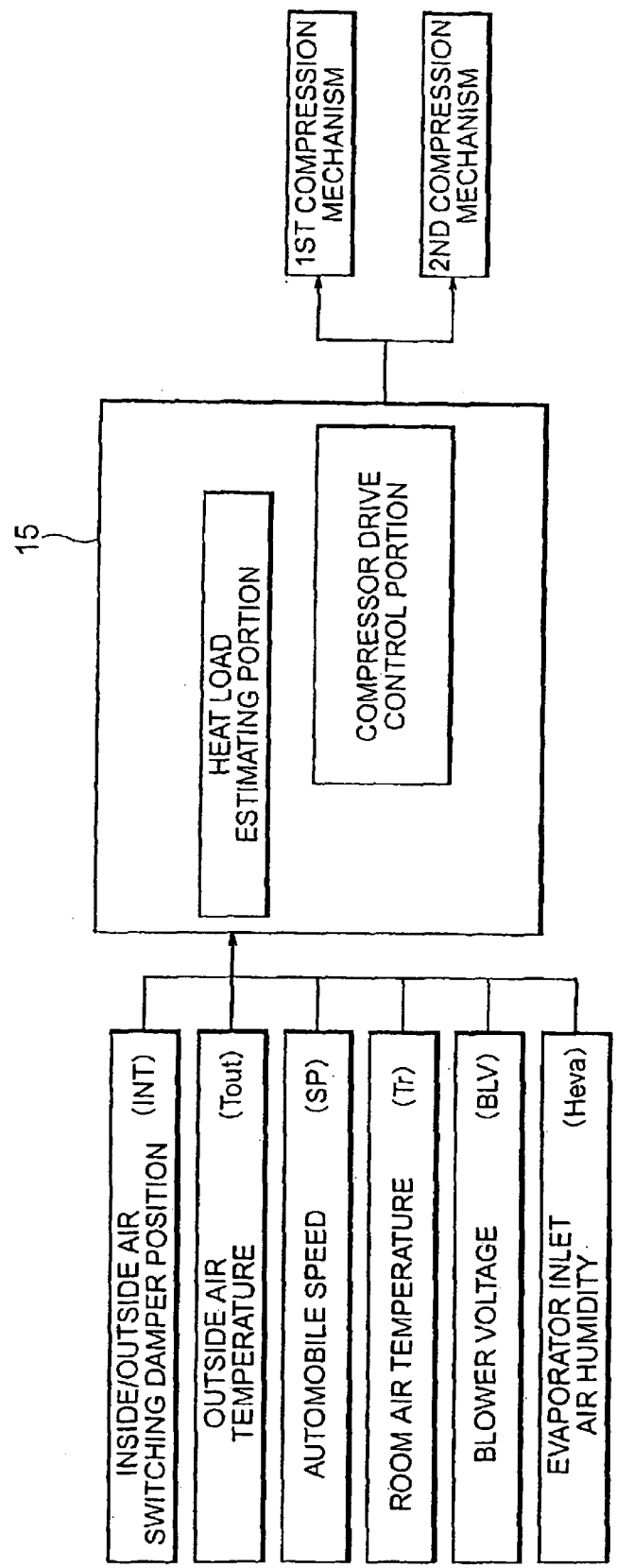
FIG. 9 is a block diagram of a controller in the air conditioner illustrated in FIG. 8.

Referring to FIG. 9 in addition, an operation of the air-conditioning controller 15 will be described.

With reference to the signal group 16 representative of the inside/outside air switching damper position INT, the outside air temperature Tout, the automobile speed SP, the room air temperature Tr, the blower voltage BLV, the evaporator inlet air humidity Heva, and the like, the air-conditioning controller 15 estimates and calculates the air-conditioning load LA in the automobile by:

LA=f(INT, Tout, SP, Tr, BLV, Heva).

Herein, the air-conditioning controller 15 serves as a heat load estimating portion.

With reference to the relationship between the air-conditioning load LA and the predetermined value d, the air-conditioning controller 15 serves as a compressor drive control portion and controls driving of the hybrid compressor 4 in accordance with the control mode to select simultaneous operation of the first and the second compression mechanisms or operation of the first or the second compression mechanism. Specifically, if LA≧d, the simultaneous operation is selected. On the other hand, if LA<d, the operation of the first or the second compression mechanism is selected. Thus, when the load is great, the simultaneous operation is selected so as to avoid insufficiency in air-conditioning ability. When the load is small, the operation of the first or the second compression mechanism is selected so as to produce desired air-conditioning ability with small power consumption without affecting other apparatuses or other operating conditions.

With each of the above-mentioned automotive air conditioners in FIGS. 1, 3, 5, and 8, the drive systems of the hybrid compressor is appropriately switched so that sufficiently large air-conditioning ability can be exhibited in dependence upon the situations, thereby avoiding insufficiency in air-conditioning ability. Furthermore, in dependence upon various other conditions related to the heat load of the automobile, the operation of one of the prime mover and the electric motor and the simultaneous operation by both of these drive sources can be optimally switched. As a consequence, it is possible to achieve optimal control of air-conditioning under any situation. As a result, it is possible to realize both of comfortable air-conditioning and power saving.

Figure 10:
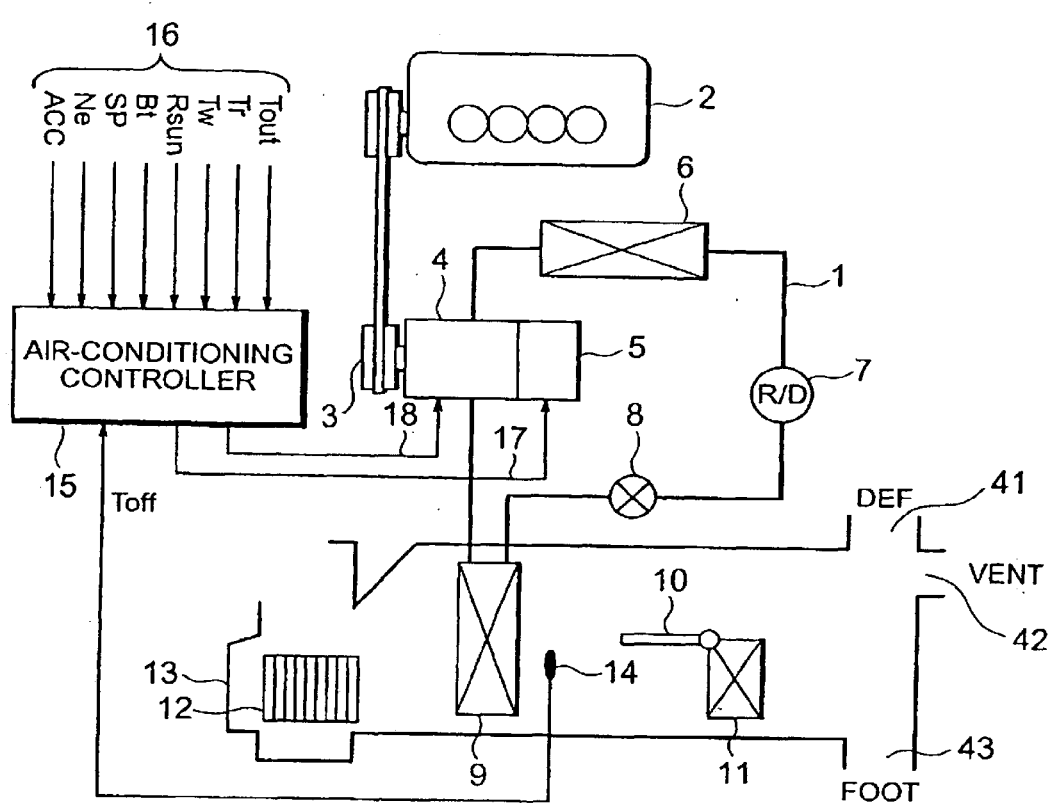
FIG. 10 is a system diagram of an air conditioner according to a fifth embodiment of the present invention.

Referring to FIG. 10, description will be made of an automotive air conditioner according to a fifth embodiment of the present invention. Similar parts are designated by like reference numerals and description thereof will be omitted. In this automotive air conditioner also, the air-conditioning controller 15 selects, as the control mode, one of the first, the second, the third, and the fourth operation modes.

In the automotive air conditioner illustrated in FIG. 10, the signal representative of the evaporator outlet air temperature Toff detected by the evaporator outlet air temperature sensor 14 is supplied to the air-conditioner controller 15 for controlling air-conditioning. Furthermore, the air-conditioning controller 15 is supplied with the signal group 16 including the outside air temperature Tout, the room air temperature Tr, the solar irradiation Rsun, a heater hot water temperature Tw, a residual charge Bt of a battery as electric power supply means (which is detected by electric power source detecting means), the engine rotation speed Ne, the automobile speed SP, and an accelerator aperture ACC. As output signals, the electric motor rotation speed control signal 17 and the clutch control signal 18 are produced.

The air-conditioning controller 15 also serves as selecting means for selecting a compressor drive source. In case where the hybrid compressor 4 is driven by the electric motor 5, the air-conditioning controller 15 is responsive to the clutch control signal 18 and turns off the clutch 3. Then, the air-conditioning controller 15 supplies the electric motor 5 with the electric motor rotation speed control signal 17 as a duty signal to control the rotation speed of the electric motor 5. On the other hand, in case where the compressor 4 is driven by the engine 2, the air-conditioning controller 15 stops output of the electric motor rotation speed control signal 17 and turns on the clutch 3. Thus, the evaporator outlet air temperature Toff is controlled by controlling the rotation sped of the electric motor 5 and by controlling on/off of the clutch or the displacement of the compressor when the compressor is driven by the electric motor 5 and when the compressor is driven by the engine 2, respectively.

Hereinafter, various embodiments of control will be described.

<Switching Condition upon High-speed Running>

In case where the compressor is driven by the engine, the rotation speed of the compressor is increased following an increase in rotation speed of the engine when the automobile is running at a high speed (for example, 80 km/h to 120 km/h). In a fixed displacement compressor in which the evaporator outlet air temperature Toff is controlled by controlling on/off of the clutch 3, an on/off cycle of the clutch is shortened following an increase in the driving speed of the compressor so that stop and restart of the compressor are frequently repeated. At the restart of the compressor, torque shock may be caused when the clutch is turned on and additional power will be consumed in order to re-establish a difference in pressure between a discharge side and a suction side. Therefore, while the automobile is running at a high speed so that the on/off cycle of the clutch is shortened, the compressor is driven by the electric motor. In this event, on/off control of the clutch is not carried out. It is therefore possible to prevent occurrence of the torque shock and increase in compressor power consumption as mentioned above.

Not only when the automobile is running at a high speed but also when the heat load upon the refrigerating cycle is low, for example, when the outside air temperature is low, on/off control of the compressor clutch is frequent. Therefore, also in the situation where a refrigerating cycle heat load is low, it is preferable to select the electric motor as the compressor drive source. It is noted here that the refrigerating cycle heat load is a value correlated with the compressor power and estimated by the outside air temperature, the room air temperature, the blower air delivery, the inside/outside air switching mode, the evaporator outlet air temperature Toff, the solar irradiation, and so on.

Figure 11:
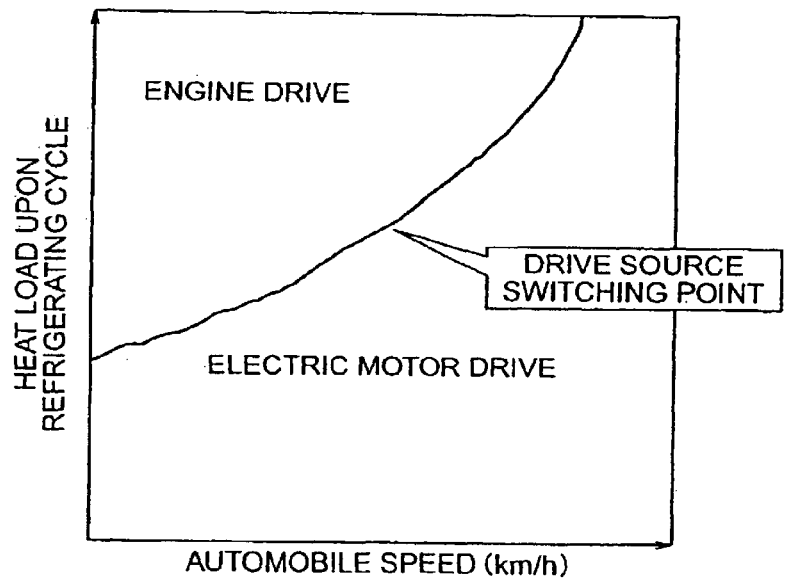
FIG. 11 is a view showing the relationship between an automobile speed and a heat load upon a refrigerating cycle, illustrating an example of a compressor drive source switching condition.

For example, control may be carried out as illustrated in FIG. 11. Specifically, as the refrigerating cycle heat load is increased, a switching point of switching from the engine into the electric motor is set at a higher automobile speed. It is assumed that the automobile speeds at the switching points under the refrigerating cycle heat loads q1 and q2 are represented by s1 and s2, respectively. Then, if q1>q2, the relationship s1≧s2 holds true. Thus, when the refrigerating cycle heat load is reduced and when the automobile speed (or the engine rotation speed) is increased, the compressor is driven by the electric motor.

It is preferable that, by detecting the three factors including the outside air temperature Tout (during introduction of the outside air) or the room air temperature Tr (during circulation of the inside air), the evaporator inlet air temperature Teva, and the blower voltage BLV, the refrigerating cycle heat load Q is estimated by:

| (during introduction of outside air) | Q = f(Tout, Teva, BLV) |
| (during circulation of inside air) | Q = f(Tr, Teva, BLV) |

Figure 12A:
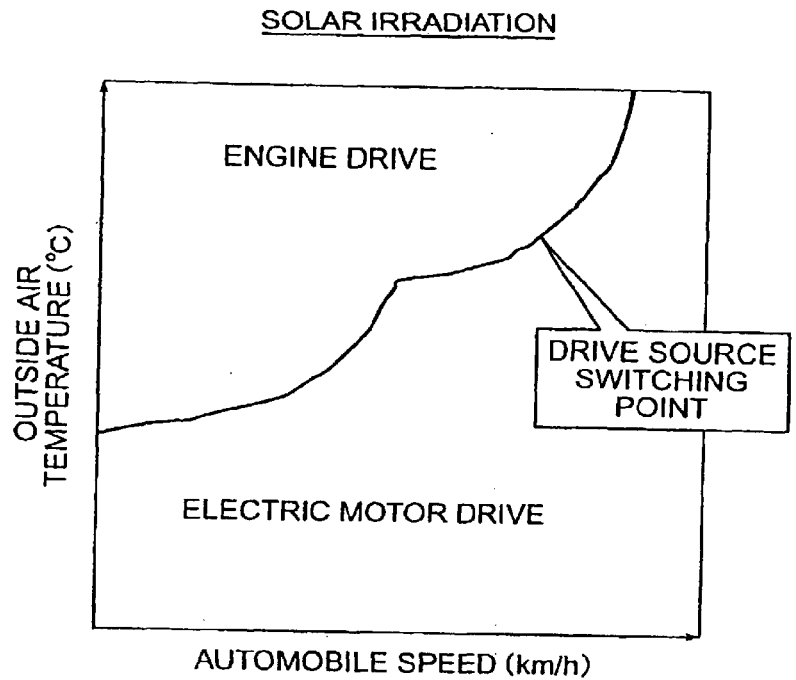
FIGS. 12A and 12B are views showing the relationship between an automobile speed and an outside air temperature, illustrating an example of the compressor drive source switching condition in presence and in absence of solar irradiation, respectively.
Figure 12B:
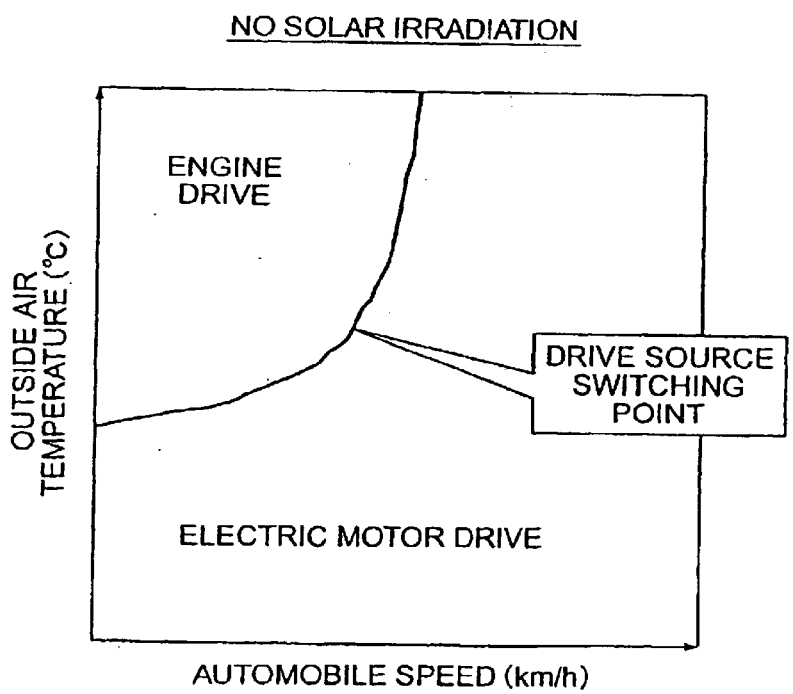

Alternatively, the refrigerating cycle heat load may be estimated by the outside air temperature and the solar irradiation. In this case, as illustrated in FIGS. 12A and 12B, the switching point is changed in dependence upon presence/absence of solar irradiation to determine the compressor drive source. Since the refrigerating cycle heat load during introduction of the outside air is different from that during circulation of the inside air, the switching point may be changed in dependence upon the introduction or the circulation mode. Herein, let the automobile speeds of the switching points at particular outside air temperatures t1 and t2 be represented by s1 and s2, respectively. Then, if t1>t2, the relationship s1≧s2 holds true. Thus, when the outside air temperature is lowered and when the automobile speed is increased, the compressor is driven by the electric motor.

<Compressor drive source Switching Control When Automobile is Stopped>

It is assumed that the automobile is in an idling state and that the engine is automatically stopped by an idling stop mechanism, for example, in a hybrid automobile. In this event, the drive force of the engine is not available. In view of the above, it is preferable that to detect the engine rotation speed and, if the engine rotation speed is not higher than a predetermined value (for example, not higher than 1000 rpm), to drive the compressor by the electric motor.

<Requirements for Electric Motor Drive>

Basically, the compressor drive source is determined by the above-mentioned switching conditions. It is noted here that, in order to use the electric motor as the compressor drive source, the under-mentioned conditions must be met.

<Switching Condition by Refrigerating Cycle Heat Load>

In summer, the room air temperature at the start of the air conditioner is often kept at a high temperature of 60–70° C. After the air conditioner is started, a seat, a dashboard, and other parts hold heat. Therefore, if the ability of the compressor is insufficient, the room air temperature may quickly be elevated by after heat of the seat and the like.

In view of the above, if the electric motor alone is selected as the compressor drive source and if the room air temperature is quickly elevated because of a large amount of after heat of the seat and the like, the engine must immediately be selected as the compressor drive source. Therefore, if the compressor drive source is switched from the engine into the electric motor alone and when the room air temperature after switching is elevated by a predetermined value Ty° C. (for example, 5° C.) or more with respect to the room air temperature at the time instant of switching, the engine should be selected as the compressor drive source at the time instant of temperature elevation by the predetermined value.

If the value of Ty is too small, idle stop will be canceled every time so that the engine will be operated when the automobile is stopped at a red light. Therefore, the value of Ty is preferably equal to about 5° C.

Consideration will be made about the case where the room air temperature is slowly elevated while the compressor is driven by the electric motor alone. In this case, if Ty is equal to 5° C., it takes a time before the room air temperature is elevated by 5° C. from a desired temperature. This may result in long-time continuation of an uncomfortable situation where the room air temperature is higher than the desired temperature. Taking the above into consideration, the value of Ty is reduced by a preselected value at the time instant when a predetermined time period (for example, one minute) has lapsed after the drive source is switched into the electric motor. For example, Ty may be changed from 5° C. to 3° C. In this event, if the room air temperature is elevated by 3° C. or more from the desired temperature, the drive source is switched from the electric motor into the engine. It is therefore possible to prevent long-time continuation of the uncomfortable situation where the room air temperature is elevated by 5° C. or more from the desired temperature.

Thus, with the automotive air conditioner illustrated in FIG. 10, it is possible to reduce power consumption of the compressor particularly when the automobile is running at a high speed and to prevent occurrence of large torque shock particularly when the compressor is rotated at a high speed.

Figure 13:
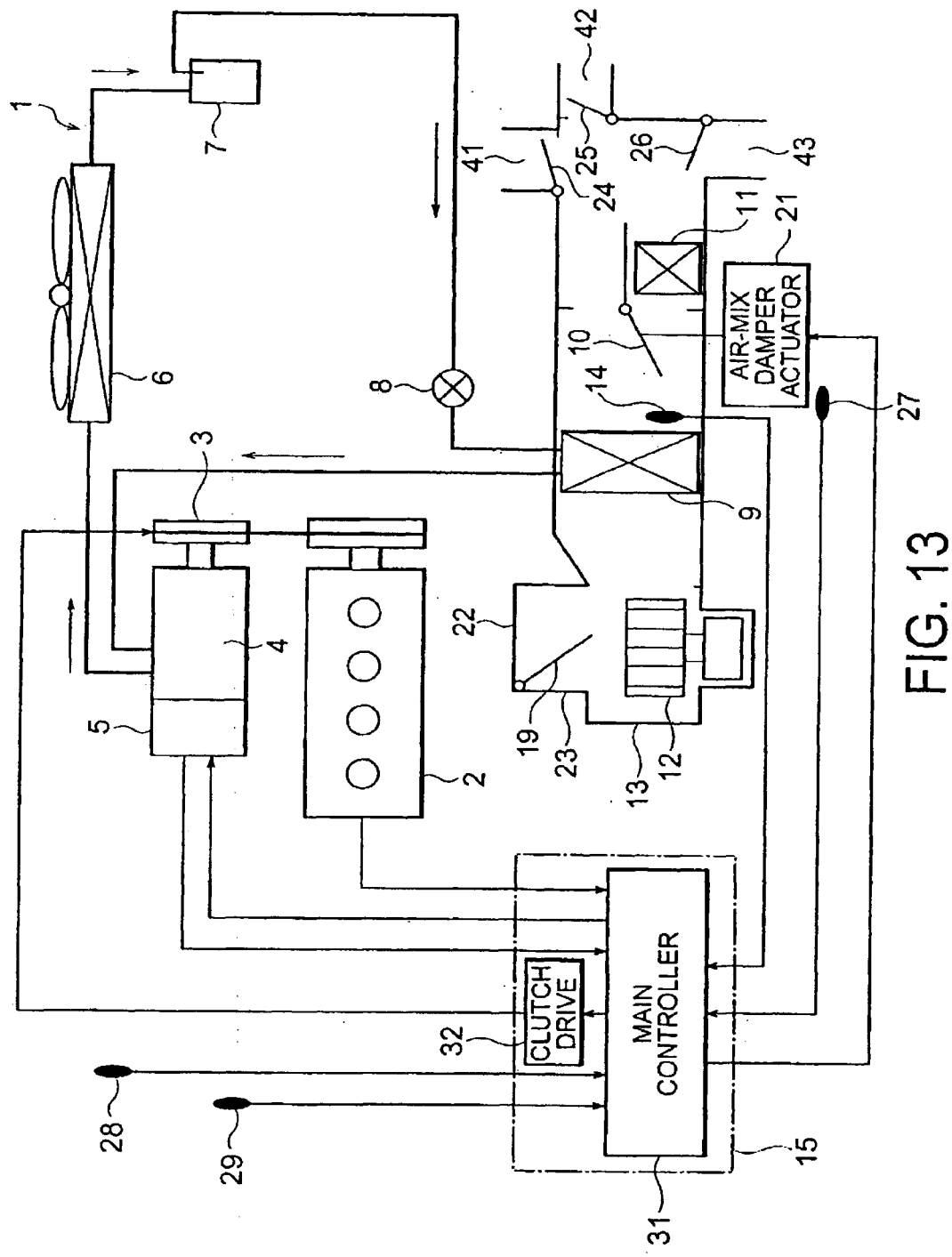
FIG. 13 is a system diagram of an air conditioner according to a sixth embodiment of the present invention.

Referring to FIG. 13, description will be made of an automotive air conditioner according to a sixth embodiment of the present invention. Similar parts are designated by like reference numerals and description thereof will be omitted. In this automotive air conditioner also, the air-conditioning controller 15 selects, as the control mode, one of the first, the second, the third, and the fourth operation modes.

In the automotive air conditioner illustrated in FIG. 13, the air duct 13 is provided with an outside air inlet port 22 and an inside air inlet port 23 formed on an inlet or upstream end thereof and switched by the switching damper 19 in order to select sucked air. Furthermore, by adjusting an aperture of the air-mix damper 10 using an air-mix damper actuator 21, a mixing ratio of the air passing through the evaporator 9 alone and the air passing through the heater core 11 is adjusted. On a downstream end of the air duct 13, the discharge ports 41, 42, and 43 such as DEF, VENT, and FOOT are formed. By dampers 24, 25, and 26, a predetermined one or ones of the discharge ports are selected.

The air-conditioning controller 15 includes a main controller 31 and a clutch drive 32 for controllably driving the electromagnetic clutch 3. The main controller 31 supplies the above-mentioned clutch control signal to the clutch drive 32, a motor control signal to a motor drive of the electric motor 5, and an air-mix damper aperture signal to the air-mix damper actuator 21.

Figure 14:
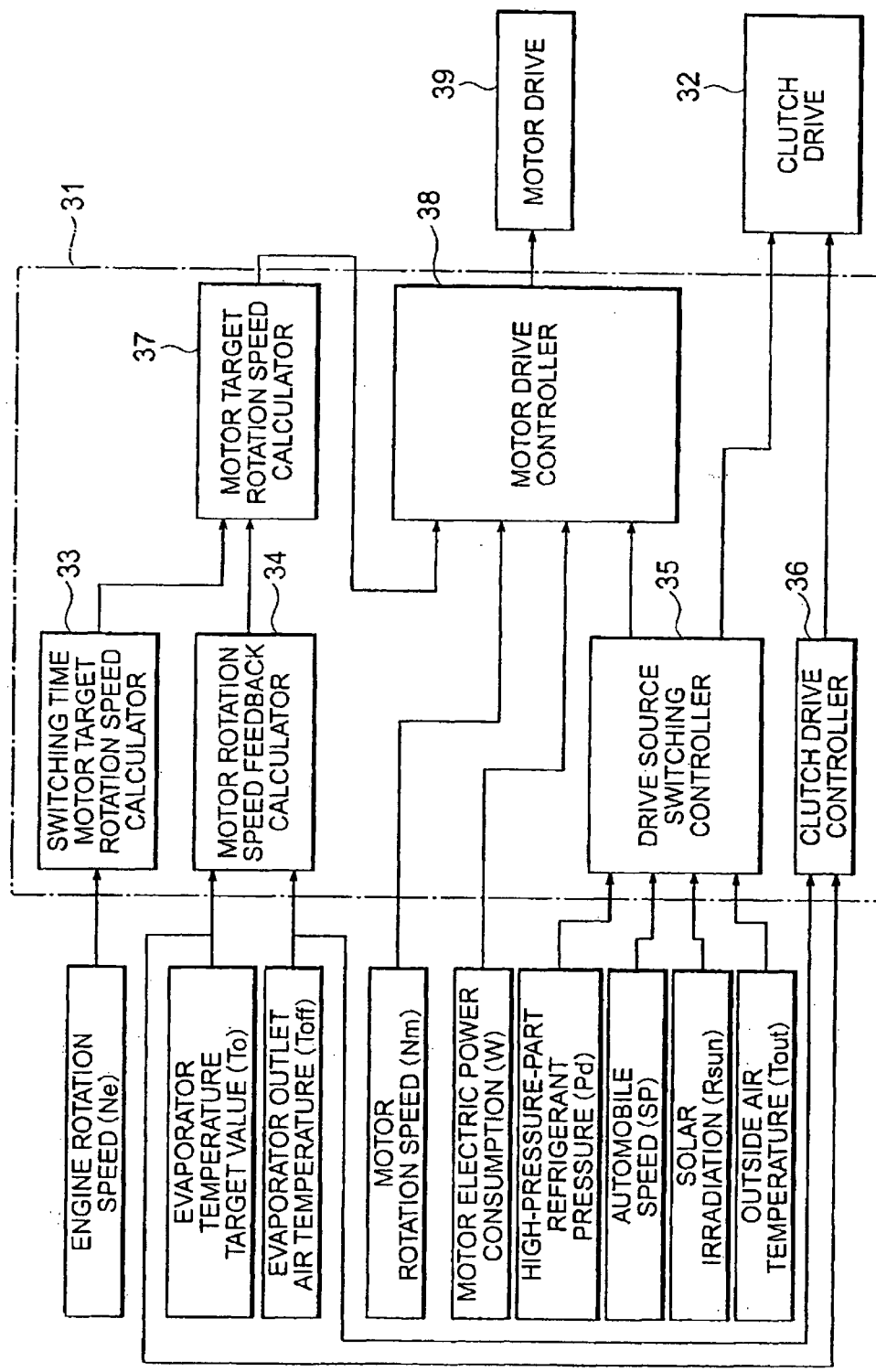
FIG. 14 is a block diagram of a controller in the air conditioner illustrated in FIG. 13.

Referring to FIG. 14 in addition, description will continue.

Various sensors for controlling air-conditioning include the evaporator outlet air temperature sensor 14 for detecting the evaporator outlet air temperature Toff, a room air temperature sensor 27 for detecting the room air temperature Tr, an outside air temperature sensor 28 for detecting the outside air temperature Tout, and a solar irradiation sensor 29 for detecting the solar irradiation Rsun.

The main controller 31 includes a switching time motor target rotation speed calculator 33, a motor rotation speed feedback calculator 34, a drive source switching controller 35, a clutch drive controller 36, a motor target rotation speed calculator 37, and a motor drive controller 38. The switching time motor target rotation speed calculator 33 is supplied with the engine rotation speed signal Ne and calculates a first motor target rotation speed Nmo1. The motor rotation speed feedback calculator 34 calculates a second motor target rotation speed Nmo2 with reference to an evaporator temperature target value To and the evaporator outlet air temperature Toff. The drive source switching controller 35 produces a switching control signal with reference to the high-pressure-part refrigerant pressure Pd, the automobile speed SP, the solar irradiation Rsun, and the outside air temperature Tout. The clutch drive controller 36 produces the clutch signal with reference to the evaporator temperature target value To and the evaporator outlet air temperature Toff. The motor target rotation speed calculator 37 calculates the sum of the first and the second motor target rotation speeds Nmo1 and Nmo2 to produce a motor target rotation speed Nmo. By the use of the motor target rotation speed Nmo, a motor rotation speed Nm, motor electric power consumption W, and the switching control signal, the motor drive controller 38 calculates a motor drive control signal D given by:

$$D=f(Nmo,Nm).$$

If W>C, the motor drive control signal D is not increased. Herein, C represents a predetermined value of motor input electric power. The motor driver control signal D is supplied to a motor drive 39. The clutch drive 32 controls the operation of the clutch 3 in response to the switching control signal and the clutch signal.

When the hybrid compressor 4 is driven substantially simultaneously by both of the engine 2 and the electric motor 3, control is carried out in the following manner.

With reference to the engine rotation speed Ne of the automobile, the switching time motor target rotation speed calculator 33 calculates the first motor target rotation speed Nmo1 as a feed-forward value, given by:

$$Nmo1=f(Ne).$$

Furthermore, with reference to the evaporator temperature target value To and the evaporator outlet air temperature Toff, the motor rotation speed feedback calculator 33 calculates the second motor target rotation speed Nmo2 as a feedback value, given by:

$$Nmo2=f(To, Toff).$$

The motor target rotation speed calculator 37 calculates a sum of the first and the second motor target rotation speeds Nmo1 and Nmo2 to produce the motor target rotation speed Nmo as:

$$Nmo=Nmo1+Nmo2.$$

The motor target rotation speed Nmo is supplied to the motor drive controller 38. With reference to the motor target rotation speed Nmo and the motor rotation speed Nm, the motor drive controller 38 produces the motor drive control signal D given by:

$$D=f(Nmo,Nm).$$

The motor drive control signal is delivered to the motor drive 39 to control the rotation speed of the motor.

Figure 15:
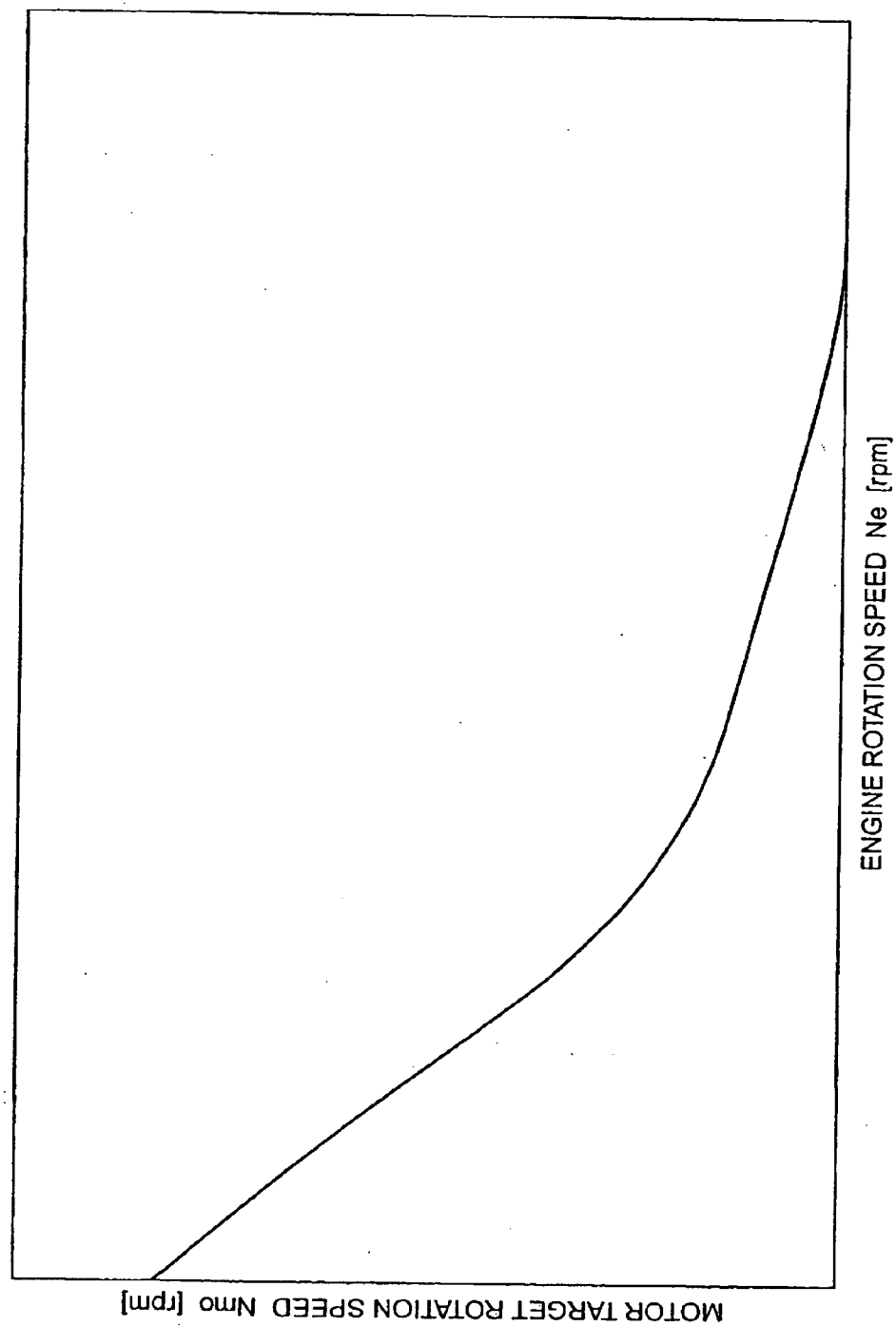
FIG. 15 is a control characteristic chart showing an example of the relationship between an engine rotation speed and a motor target rotation speed in the controller illustrated in FIG. 14.

For example, characteristics illustrated in FIG. 15 are obtained by the above-mentioned control. FIG. 15 shows the result of calculation of the motor target rotation speed Nmo with respect to the engine rotation speed Ne under a given condition.

Generally, it is required to drive the hybrid compressor simultaneously by both of the drive sources when the cooling ability of the cooler is insufficient by the use of only one of the drive sources. In this event, with respect to the evaporator temperature target value, the motor rotation speed is controlled in response to the variation in engine rotation speed and variation in evaporator outlet air temperature Toff. Basically, the above-mentioned control is carried out, for example, in the following manner.

When the engine rotation speed Ne is reduced, Nmo is increased and Nm is increased.

When the engine rotation speed Ne is increased, Nmo is decreased or maintained and Nm is decreased or maintained.

Figure 16:
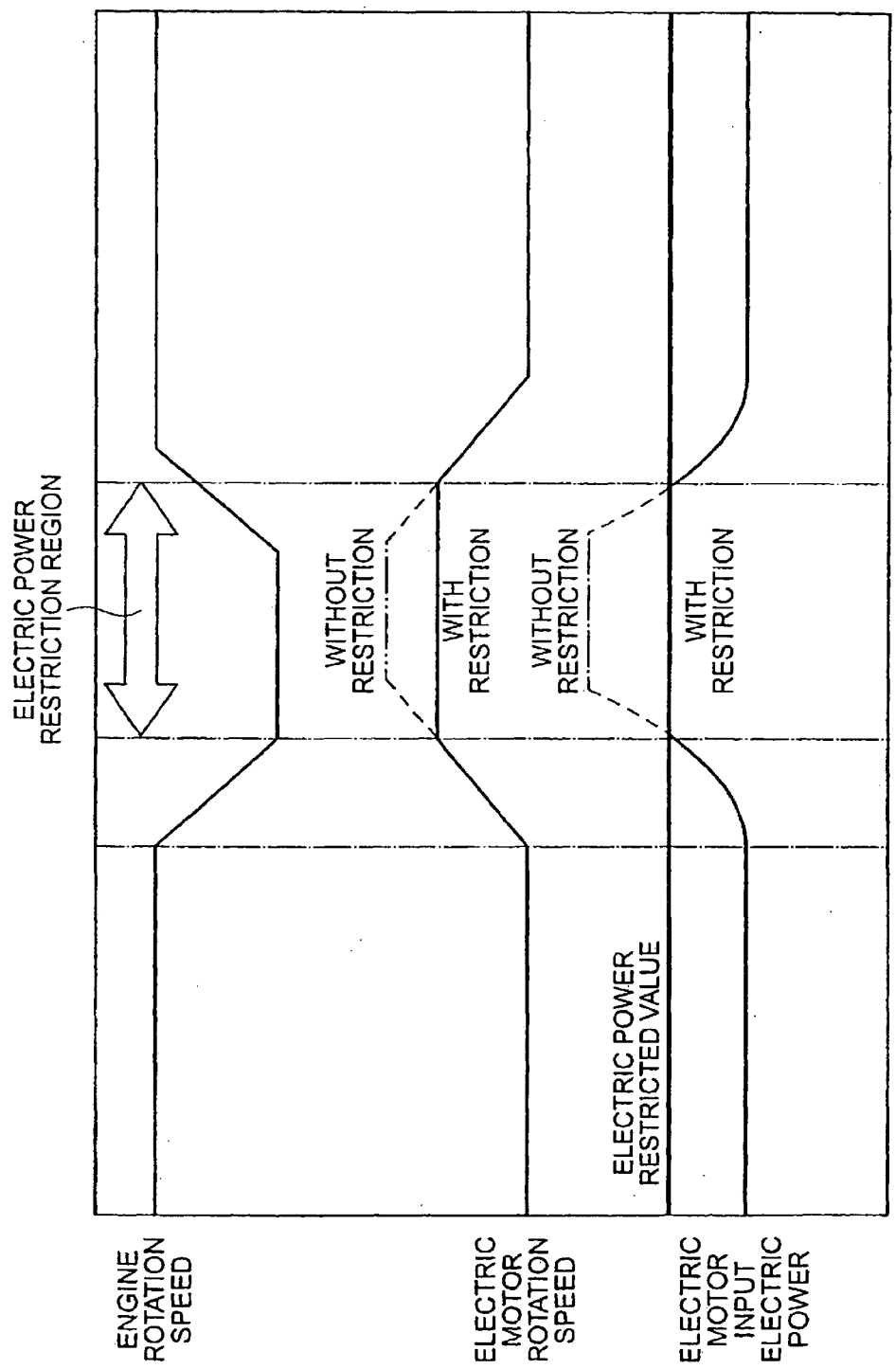
FIG. 16 is a characteristic chart showing an example of control in the controller illustrated in FIG. 14, in which the rotation speed and input electric power of an electric motor are controlled during electric power restriction.

In the control described in conjunction with FIG. 14, the motor rotation speed is controlled in the following manner with reference to the electric power consumption W of the motor and with respect to the predetermined value C of the motor input electric power. A specific example of the control when the electric power is restricted is illustrated in FIG. 16. Specifically, if the motor input electric power is higher than the predetermined value C, the motor drive control signal D is not increased. For example, the motor rotation speed is decreased. If the motor input electric power is lower than the predetermined value C, control is carried out in the manner similar to that mentioned above.

Figure 17:
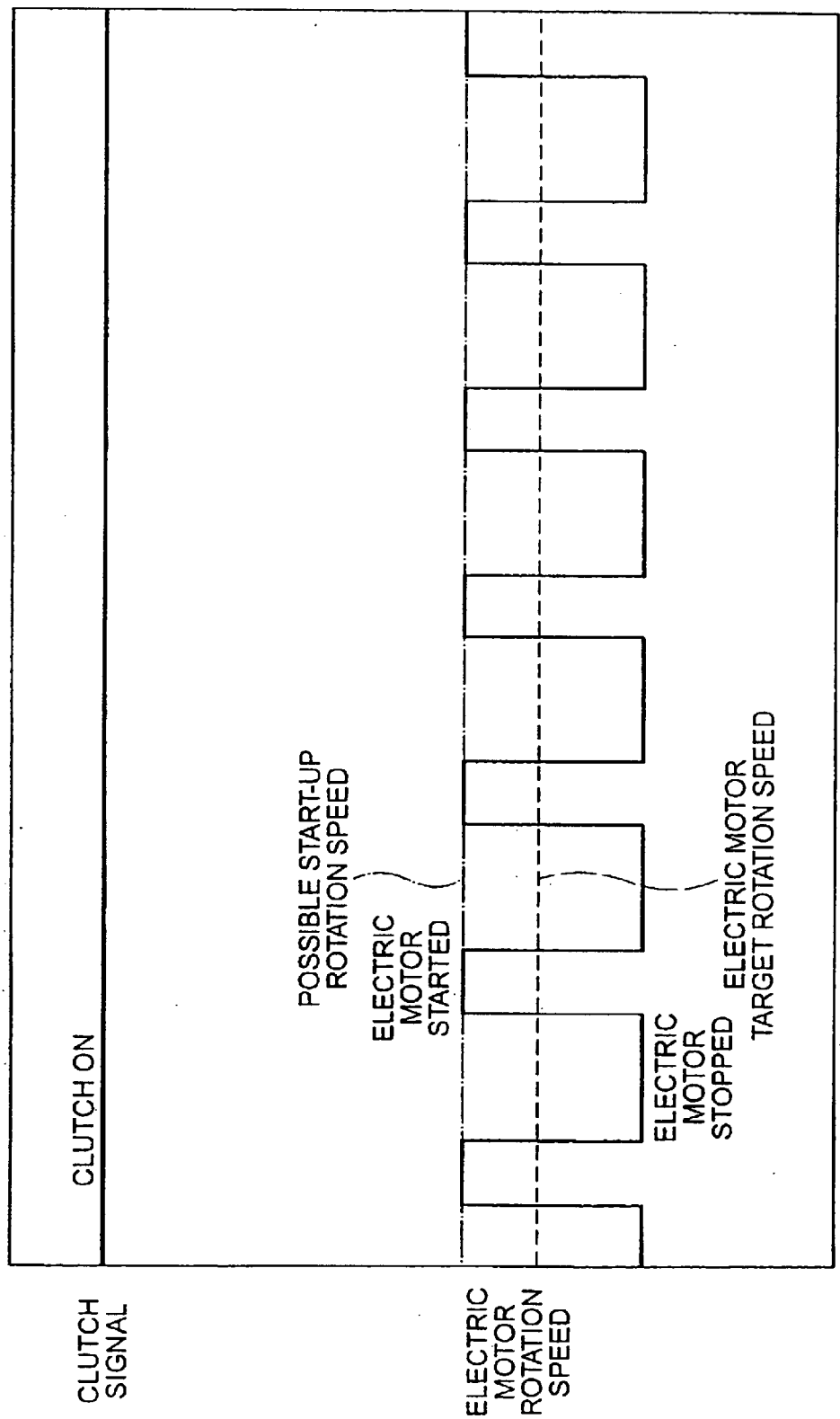
FIG. 17 is a control characteristic chart showing an example in case where the electric motor is controllably turned on and off.

For example, if the motor can not be controlled (started) at the target rotation speed due to the restriction in electric power or restriction in rotation speed at which the electric motor can be started, the motor rotation speed may be controlled in the following manner. Specifically, the motor is started at a possible start-up rotation speed. At a predetermined time interval, start-up operation of the electric motor (at the rotation speed at which the motor can be started) and motor stop operation or low-speed rotation are repeatedly alternately carried out. An example of the control is illustrated in FIG. 17. In the figure, the rotation at the rotation speed allowing the electric motor to start up and the stop of the electric motor are repeatedly alternately carried out at the predetermined time interval.

In the control described in conjunction with FIG. 14, when the drive source of the compressor is switched, i.e., from the motor drive to the engine drive or from the engine drive to the motor drive, switching control may be carried out, for example, by determining the necessity of switching with reference to the heat load (outside air temperature, solar irradiation, automobile speed, etc.) of the refrigerating cycle of the automobile.

By the above-mentioned control, when the compressor is driven simultaneously by both of the engine and the motor, it is possible to optimally control, particularly, the motor rotation speed in dependence upon the situation, thereby appropriately controlling the temperature of the cooler to suppress the variation in discharge temperature. For the insufficiency in refrigerating ability, appropriate control of the cooler temperature is possible. In case where the electric power is restricted, the rotation speed of the electric motor and consequently the electric power consumption of the electric motor can be appropriately controlled.

Therefore, in the automotive air conditioner illustrated in FIG. 13, it is possible to optimally control driving of the compressor when the hybrid compressor is driven simultaneously by both of the drive sources. Even under the situation in which the refrigerating ability of the refrigerating cycle is insufficient, appropriate control of the cooler temperature can be carried out. If the engine rotation speed is varied, appropriate control of the cooler temperature by the electric motor is carried out. It is therefore possible to make a passenger feel comfortable without variation in cooler temperature or discharge temperature. Since the appropriate control by the electric motor can be carried out even if the electric power is restricted, the electric power consumption of the electric motor can be reduced.

Figure 18:
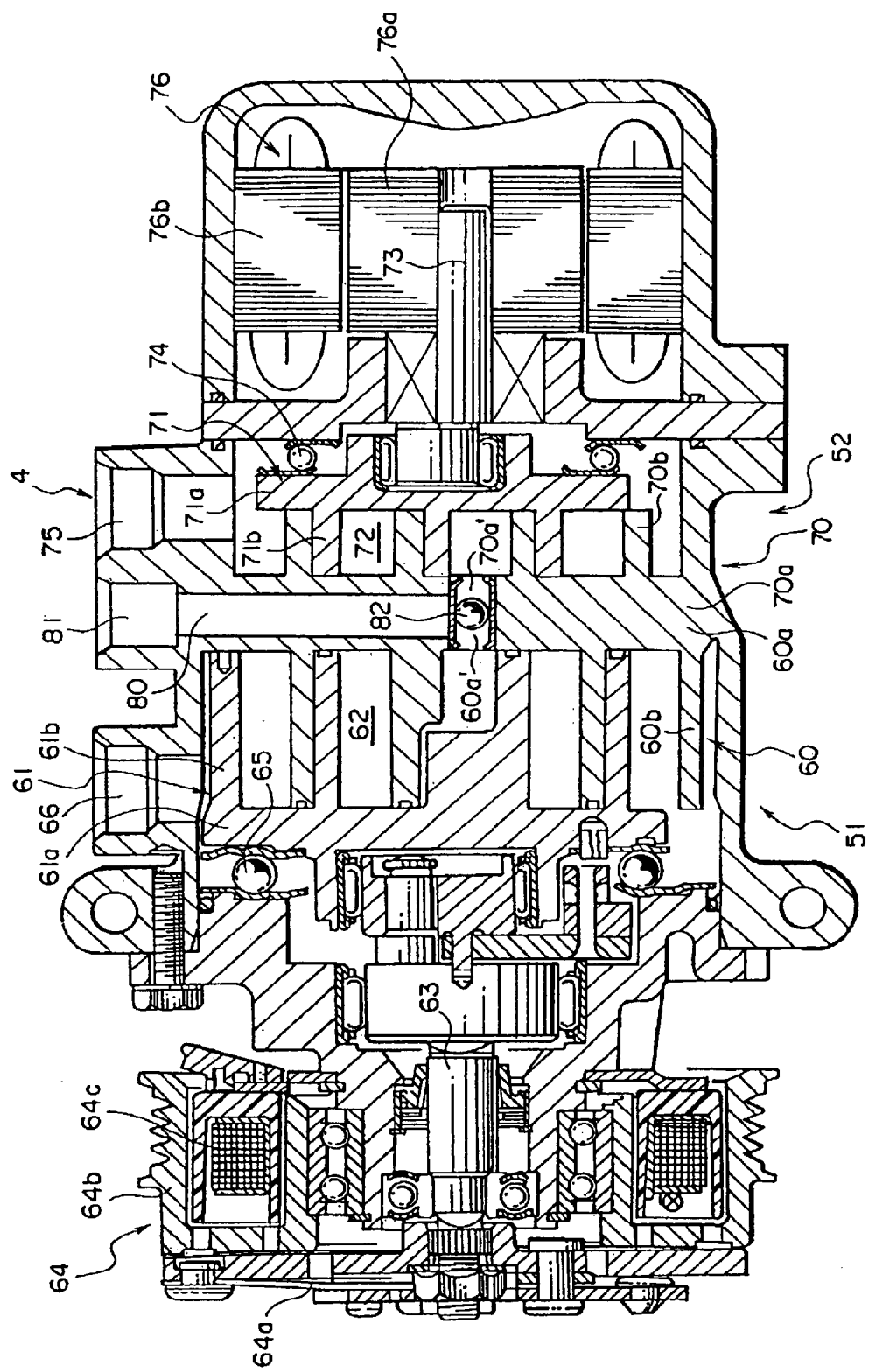
FIG. 18 is a sectional view of a hybrid compressor which can be used in the air conditioner illustrated in each of FIGS. 1, 3, 5, 8, 10, and 13.

With reference to FIG. 18, description will be directed to the hybrid compressor 4.

In FIG. 18, the hybrid compressor 4 has a first compression mechanism 51 and a second compression mechanism 52. The hybrid compressor 4 is used, for example, in a refrigerant cycle of an air conditioning system mounted in a vehicle known in the art.

The first compression mechanism 51 comprises a first fixed scroll 60 having a first fixed end plate 60a and a first fixed spiral element 60b, a first orbital scroll 61 having a first orbital end plate 61a, and a first orbital spiral element 61b. The first fixed scroll 60 and the first orbital scroll 61 engage to form a first plurality of pairs of fluid pockets 62. The first compression mechanism 51 also comprises a first drive shaft 63, which engages the first orbital scroll 61 and provides an orbital movement to the first orbital scroll 61, and an electromagnetic clutch 64 corresponding to the above-mentioned clutch 3. The electromagnetic clutch 64 comprises a clutch armature 64a fixed to the first drive shaft 63, a pulley 64b connected to an engine or electric motor (not shown) of a vehicle via a belt (not shown), and an electromagnet 64c for connecting and disconnecting the clutch armature 64a and the pulley 64b. Further, the first compression mechanism 51 comprises a first rotation prevention device 65 for preventing the rotation of the first orbital scroll 61, and a first inlet port 66 formed through a casing. A first discharge port 60a' is formed through a first surface of the first end plate 60a of first fixed scroll 60. The engine of a vehicle for use in driving first compression mechanism 51 may include either an internal combustion engine or an electric motor for driving a vehicle.

The second compression mechanism 52 comprises a second fixed scroll 70 having a second fixed end plate 70a and a second fixed spiral element 70b, a second orbital scroll 71 having a second orbital end plate 71a and a second orbital spiral element 71b. The second fixed scroll 70 and the second orbital scroll 71 engage to form a second plurality of pairs of fluid pockets 72, the second compression mechanism 52 also comprises a second drive shaft 73 engaging, which engages the second orbital scroll 71 and provides an orbital movement to the second orbital scroll 71, a second rotation prevention device 74 for preventing the rotation of the second orbital scroll 71, and a second inlet port 75 formed through the casing. A second discharge port 70a' is formed through a second surface of the second fixed end plate 70a of the second fixed scroll 70. An electric motor 76 is provided for driving the second drive shaft 73 of the second compression mechanism 52. The electric motor 76 has a rotor 76a which is fixed to the second drive shaft 73 and a stator 76b.

The first fixed scroll 60 of the first compression mechanism 51 and the second fixed scroll 70 of the second compression mechanism 52 are disposed back-to-back, and the fixed scrolls are formed integrally. Thus, together, the end plates 60a and 70a form a shared end plate. A discharge path 80 is formed between the end plates 60a and 70a and within the shared end plate. An outlet port 81 is formed at a downstream end of the discharge path 80. The first discharge port 60a' formed through the first end plate 60a of the first compression mechanism 51 and the second discharge port 70a' formed through the second end plate 70a of the second compression mechanism 52 are connected to an upstream end of the discharge path 80 via a check valve 82. The first compression mechanism 51 and the second compression mechanism 52, thus configured, are formed integrally in the hybrid compressor 4.

When the hybrid compressor 4 is driven by an engine, the electromagnetic clutch 64 is activated, the rotational output of the engine is transmitted to the first drive shaft 63 of the first compression mechanism 51 via the clutch armature 64a, and the first orbital scroll 61 is driven in its orbital movement by the first drive shaft 63. The refrigerant introduced from the first inlet port 66 flows into the fluid pockets 62. The fluid pockets 62 move toward the center of the first fixed scroll 60 while being reduced in volume, whereby the refrigerant in the fluid pockets 62 is compressed. The compressed refrigerant is discharged to the discharge path 80 through the first discharge port 60a formed through the first end surface of the first end plate 60a of the fixed scroll 60 via the check valve 82. The discharged then flows out to a high pressure side of an external refrigerant circuit through the outlet port 81.

In this condition, electric power need not be, and generally is not, supplied to the electric motor 76 provided for driving the second drive shaft 73 of second compression mechanism 52 and, consequently, the electric motor 76 does not rotate. Therefore, the second compression mechanism 52 does not operate. Because the second discharge port 70a' of the second compression mechanism 52 is closed by the check valve 82, the refrigerant discharged from the first compression mechanism 51 does not flow backward into the second compression mechanism 52.

When the hybrid compressor 4 is driven by the electric motor 76, the electric motor 76 is activated, the rotational output of the electric motor 76 is transmitted to the second drive shaft 73 of the second compression mechanism 52, and the second orbital scroll 71 is driven in its orbital movement by the second drive shaft 73. The refrigerant introduced from the second inlet port 75 flows into the fluid pockets 72. The fluid pockets 72 move toward the center of the second fixed scroll 70 while being reduced in volume, whereby the refrigerant in the fluid pockets 72 is compressed. The compressed refrigerant is discharged to the discharge path 80 through the second discharge port 70a' formed through the second end surface of the second end plate 70a of the second fixed scroll 70 via the check valve 82, and the discharged refrigerant then flows out to a high pressure side of an external refrigerant circuit through the outlet port 81.

What is claimed is:

1. An air conditioner for a vehicle, comprising:
   a refrigeration circuit, wherein said refrigeration circuit comprises:
   a hybrid compressor comprising:
   a first compression mechanism driven by a first drive source;
   a second compression mechanism driven by a second drive source; and
   a single discharge port connected to each of said first compression mechanism and said second compression mechanism; and
   a controller connected to said hybrid compressor, wherein said controller is adapted for:
   estimating an amount of power consumed by said hybrid compressor; and selecting a particular operation mode for said hybrid compressor from a plurality of operation modes, wherein said particular operation mode is selected based at least on said estimated amount of power consumed by said hybrid compressor, wherein said plurality of operation modes comprise:
- a first operation mode in which said first drive source drives said first compression mechanism;
- a second operation mode in which said second drive source drives said second compression mechanism; and
- a third operation mode in which said first drive source drives said first compression mechanism and said second drive source drives said second compression mechanism.

2. The air conditioner according to claim 1, wherein said controller is further adapted for:
estimating a cooling capacity of said air conditioning system; and
selecting said particular operation mode based at least on said cooling capacity of said air conditioning system.

3. The air conditioner according to claim 1, wherein said controller is further adapted for:
estimating a heat load on said refrigeration circuit; and
receiving a particular speed signal, wherein said particular speed is related to said vehicle; and
selecting said particular operation mode based at least on said estimated heat load of said refrigeration circuit and said particular speed.

4. The air conditioner according to claim 3, wherein said particular speed is a speed of said vehicle.

5. The air conditioner according to claim 3, wherein said particular speed is a driving speed of said first drive source.

6. The air conditioner according to claim 3, wherein said controller selects said second operation mode when said particular speed is greater than a variable, predetermined speed, and selects said first operation mode when said particular speed is less than or equal to said variable, predetermined speed.

7. The air conditioner according to claim 6, wherein said controller is further adapted for varying said variable, predetermined speed based on said estimated heat load on said refrigeration circuit.

8. The air conditioner according to claim 7, wherein said variable, predetermined speed is different in an outside air introduction state, where outside air is introduced into said vehicle, than in an inside air circulation state where inside air is circulated.

9. The air conditioner according to claim 3, further comprising:
a. blower; and
an air duct for guiding air fed by said blower to the inside of said vehicle, wherein said controller estimates said heat load on said refrigeration circuit based at least on an outside air temperature, a temperature of air inside said vehicle, an air temperature at an outlet of an evaporator of said refrigeration circuit, and a physical quantity related to an air delivery of said blower in an outside air introduction state where outside air is introduced into said air duct.

10. The air conditioner according to claim 3, further comprising:
an outside air temperature sensor for detecting an outside air temperature; and
a solar irradiation sensor for detecting an amount of solar irradiation, wherein said controller estimates said heat load on said refrigeration circuit based at least on said outside air temperature and said amount of solar irradiation.

11. The air conditioner according to claim 1, further comprising means for detecting an air temperature within said vehicle, wherein after said controller transitions said particular operation mode from said first operation mode to said second operation mode, said controller is further adapted for transitioning said particular operation mode from said second operation mode to said first operation mode when a difference between said air temperature within said vehicle at a time when said controller transitioned said particular operation mode from said first operation mode to said second operation mode and a current air temperature within said vehicle is greater than a predetermined temperature difference.

12. The air conditioner according to claim 11, wherein after said controller transitions said particular operation mode from said first operation mode or said third operation mode to said second operation mode, said controller is further adapted for transitioning said particular operation mode from said second operation mode to said first operation mode or said third operation mode after the expiration of a predetermined amount of time.

13. The air conditioner according to claim 1, wherein said refrigeration circuit comprises a cooler for cooling air to be supplied into an interior of said vehicle, said air conditioner further comprising means for detecting a temperature of said cooler, wherein when said particular operation mode is said third operation mode, said controller controls said second drive source at least based on said temperature of said cooler.

14. The air conditioner according to claim 13, wherein said first drive source is a prime mover of said vehicle, and said second drive source comprises an electric motor.

15. The air conditioner according to claim 14, further comprising means for detecting a rotational speed of said first drive source, wherein said controller controls the rotational speed of said electric motor based at least one said temperature of said cooler and the rotational speed of said first drive source.

16. The air conditioner according to claim 15, wherein said controller controls the rotational speed of said electric motor, such that the rotational speed of said electric motor increases when the rotational speed of said first drive source decreases, and the rotational speed of said electric motor decreases when the rotational speed of said first drive source increases.

17. The air conditioner according to claim 13, wherein said controller is further adapted for calculating a desired temperature for said cooler, wherein said controller controls the rotational speed of said electric motor at least based on said desired temperature for said cooler.

18. The air conditioner according to claim 13, wherein said controller is further adapted for detecting an input electric power supplied to said electric motor, wherein said controller restricts the rotational speed of said electric motor when said input electric power is less than a predetermined amount of electrical power value.

19. The air conditioner according to claim 13, wherein said controller is further adapted for varying the rotational speed of said electric motor at a predetermined interval.

20. An air conditioner for a vehicle, comprising:
a refrigeration circuit, wherein said refrigeration circuit comprises:
a hybrid compressor comprising:
a first compression mechanism driven by a first drive source;

a second compression mechanism driven by a second drive source; and a single discharge port connected to each of said first compression mechanism and said second compression mechanism; and a controller connected to said hybrid compressor, wherein said controller is adapted for:

estimating a cooling capacity of said air conditioning system; and selecting a particular operation mode for said hybrid compressor from a plurality of operation modes, wherein said particular operation mode is selected based at least on said estimated cooling capacity of said air conditioning system, wherein said plurality of operation modes comprise:

a first operation mode in which said first drive source drives said first compression mechanism;

a second operation mode in which said second drive source drives said second compression mechanism; and a third operation mode in which said first drive source drives said first compression mechanism and said second drive source drives said second compression mechanism.

21. An air conditioner for a vehicle, comprising:

a refrigeration circuit, wherein said refrigeration circuit comprises:

a hybrid compressor comprising:

a first compression mechanism driven by a first drive source;

a second compression mechanism driven by a second drive source; and a single discharge port connected to each of said first compression mechanism and said second compression mechanism; and a controller connected to said hybrid compressor, wherein said controller is adapted for:

estimating a heat load of said vehicle; and selecting a particular operation mode for said hybrid compressor from a plurality of operation modes, wherein said particular operation mode is selected based at least on said estimated heat load of said vehicle.

22. The air conditioner according to claim 21, wherein said refrigeration circuit further comprises:

a condenser connected to said hybrid compressor; and an evaporator connected to said hybrid compressor.

23. The air conditioner according to claim 22, wherein said controller estimates said heat load of said vehicle based on at least one physical quantity selected from the group consisting of a temperature of air passing through said condenser, a speed of said air passing through said condenser, a temperature of air passing through said evaporator, a humidity of said air passing through said evaporator, and a speed of said air passing through said evaporator.

24. The air conditioner according to claim 22, further comprising a blower for delivering air to said evaporator, wherein said controller estimates said heat load of said vehicle based on at least one physical quantity selected from the group consisting of an outside air temperature, an air temperature in said vehicle, information related to whether said air conditioner is in an outside air introducing state or in an inside air circulation state, a speed of said vehicle, said blower, and a humidity of said air passing through said evaporator.

25. The air conditioner according to claim 21, wherein said controller estimates said heat load of said vehicle based on to at least one physical quantity selected from the group consisting of a running speed of said vehicle, an amount of solar irradiation, and an outside air temperature.

26. The air conditioner according to claim 21, wherein said controller estimates said heat load of said vehicle based at least one a refrigerant pressure in a high pressure portion of said refrigeration circuit.

27. The air conditioner according to claim 21, wherein said controller is further adapted for:

calculating a difference between an outside air temperature and a target temperature for air inside said vehicle to produce a calculated value; and estimating a heat load of said vehicle based at least one said calculated value.

* * * * *